US010224517B2

(12) United States Patent
Kimura

(10) Patent No.: US 10,224,517 B2
(45) Date of Patent: Mar. 5, 2019

(54) SECONDARY BATTERY AND ELECTRONIC DEVICE

(71) Applicant: SEMICONDUCTOR ENERGY LABORATORY CO., LTD., Atsugi-shi, Kanagawa-ken (JP)

(72) Inventor: Masayuki Kimura, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 86 days.

(21) Appl. No.: 14/992,133

(22) Filed: Jan. 11, 2016

(65) Prior Publication Data
US 2016/0233469 A1 Aug. 11, 2016

(30) Foreign Application Priority Data

Jan. 16, 2015 (JP) ................. 2015-006334

(51) Int. Cl.
| | |
|---|---|
| *H01M 2/10* | (2006.01) |
| *H01M 2/06* | (2006.01) |
| *H01M 2/02* | (2006.01) |
| *H01M 10/02* | (2006.01) |
| *H01M 10/04* | (2006.01) |

(52) U.S. Cl.
CPC ....... *H01M 2/0212* (2013.01); *H01M 2/0275* (2013.01); *H01M 2/0277* (2013.01); *H01M 2/021* (2013.01)

(58) Field of Classification Search
CPC .. H01M 2/021; H01M 2/0212; H01M 2/0275; H01M 2/0277
See application file for complete search history.

(56) References Cited

U.S. PATENT DOCUMENTS

| | | | |
|---|---|---|---|
| 8,785,030 B2 | 7/2014 | Ueda | |
| 8,884,845 B2 | 11/2014 | Yamazaki et al. | |
| 2002/0172017 A1* | 11/2002 | Tarnowski | ............ G06F 1/1622 361/730 |
| 2012/0121963 A1* | 5/2012 | Kwon | ................. H01M 2/0275 429/127 |

(Continued)

FOREIGN PATENT DOCUMENTS

| | | |
|---|---|---|
| JP | 2000-173559 A | 6/2000 |
| JP | 2005-157317 A | 6/2005 |
| WO | WO-2012/140709 | 10/2012 |

*Primary Examiner* — Carlos Barcena
(74) *Attorney, Agent, or Firm* — Nixon Peabody LLP; Jeffrey L. Costellia

(57) ABSTRACT

A secondary battery suitable for a portable information terminal or a wearable device is provided. An electronic device having a novel structure that can have various exterior forms and a secondary battery that fits the forms of the electronic device are provided. The problem that strong external force unintentionally bends a secondary battery or an electronic device with a built-in secondary battery beyond the limits, resulting in a too small radius of curvature can be solved. The secondary battery has a structure in which a positive electrode and a negative electrode are included with a separator interposed therebetween. Between this structure and an exterior body, a thermoplastic substance which becomes flexible in the range around a surface temperature of human skin, higher than or equal to 30° C. and lower than or equal to 37° C., is provided.

21 Claims, 16 Drawing Sheets

(56) References Cited

U.S. PATENT DOCUMENTS

2013/0083496 A1* 4/2013 Franklin ............... G06F 1/1626
361/749
2015/0111088 A1   4/2015 Hiroki et al.
2015/0333359 A1  11/2015 Takahashi et al.

* cited by examiner

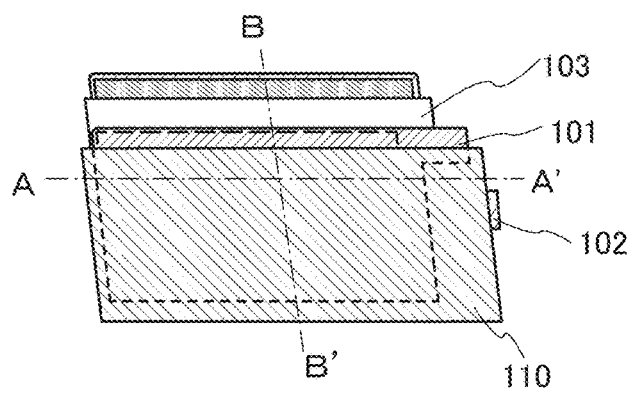
FIG. 2A
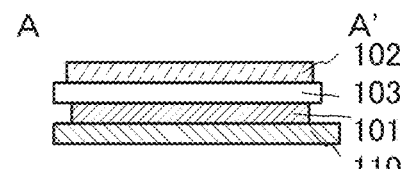
FIG. 2A1
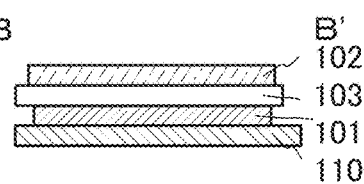
FIG. 2A2
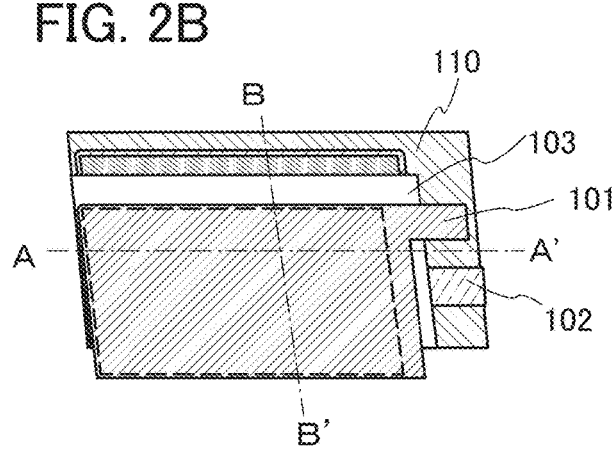
FIG. 2B
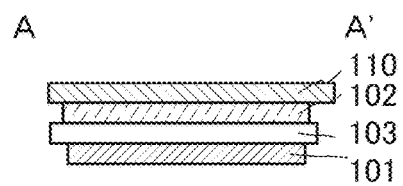
FIG. 2B1
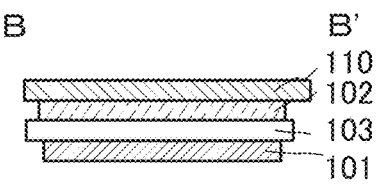
FIG. 2B2
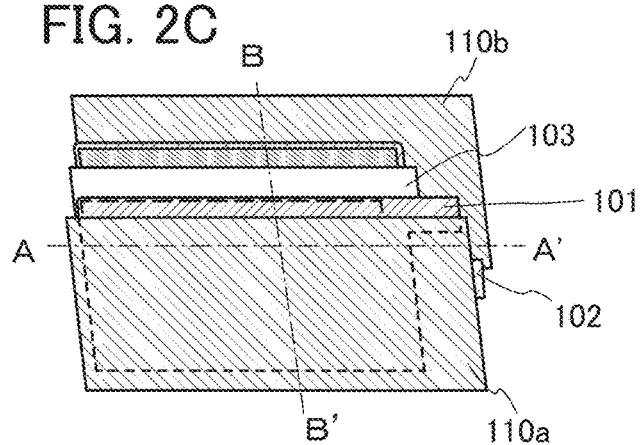
FIG. 2C
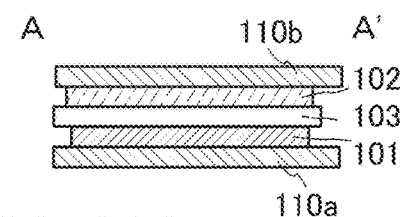
FIG. 2C1
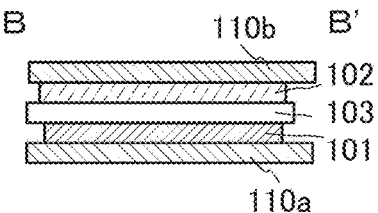
FIG. 2C2

FIG. 12A
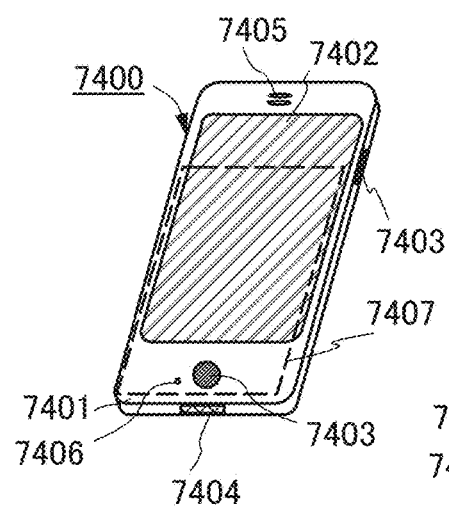
FIG. 12B
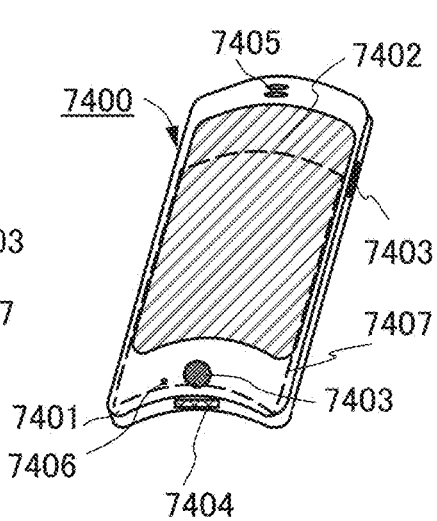
FIG. 12C
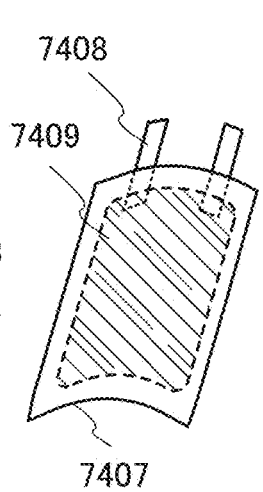
FIG. 12D
FIG. 12E
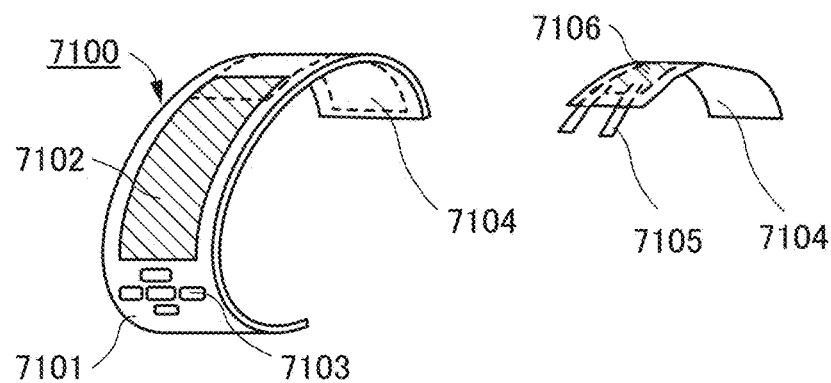

SECONDARY BATTERY AND ELECTRONIC DEVICE

BACKGROUND OF THE INVENTION

1. Field of the Invention

One embodiment of the present invention relates to a secondary battery. The present invention relates to an object, a method, or a fabricating method. In addition, the present invention relates to a process, a machine, manufacture, or a composition of matter. Furthermore, one embodiment of the present invention relates to a semiconductor device, a display device, a light-emitting device, an imaging device, a power storage device, and a method for driving them, or a method for fabricating them. In particular, one embodiment of the present invention relates to an electronic device.

Note that electronic devices in this specification mean all devices including secondary batteries, and electro-optical devices including secondary batteries, information terminal devices including secondary batteries, vehicles including secondary batteries, and the like are all electronic devices.

2. Description of the Related Art

In recent years, portable information terminals typified by smartphones have been actively developed. Portable information terminals, which are a kind of electronic devices, are desired to be lightweight and compact.

As an example of a wearable device with which information can be obtained visually without using hands at any place, Patent Document 1 is disclosed. Patent Document 1 discloses a goggle-type display device that includes a CPU and is capable of communication. The device disclosed in Patent Document 1 is also a kind of electronic device.

Most wearable devices and portable information terminals include secondary batteries that can be repeatedly charged and discharged, and have problems in that there is a limitation on the time for operation because their light weight and compactness limit the battery capacity. Secondary batteries used in wearable devices and portable information terminals should be lightweight and compact and should be able to be used for a long time.

Examples of the secondary battery include a nickel-metal hydride battery and a lithium-ion secondary battery. In particular, lithium-ion secondary batteries have been actively researched and developed because capacity thereof can be increased and size thereof can be reduced.

Electrodes serving as positive electrodes or negative electrodes of lithium-ion secondary batteries are each formed using, for example, lithium metal, a carbon-based material, or an alloy material.

REFERENCE

[Patent Document 1] Japanese Published Patent Application No. 2005-157317

SUMMARY OF THE INVENTION

One object is to provide a secondary battery suitable for a portable information terminal or a wearable device. Another object is to provide a novel power storage device.

Another object is to provide an electronic device having a novel structure. Specifically, an electronic device having a novel structure that can be changed in appearance in various ways is provided. Another object is to provide an electronic device having a novel structure that can have various exterior forms and a secondary battery that fits the forms of the electronic device.

One object is to solve a problem that strong external force unintentionally bends a secondary battery or an electronic device with a built-in secondary battery beyond the limits, resulting in a too small radius of curvature.

Note that the descriptions of these objects do not disturb the existence of other objects. One embodiment of the present invention does not necessarily achieve all the objects listed above. Other objects will be apparent from and can be derived from the description of the specification, the drawings, the claims, and the like.

Electronic devices such as a portable information terminal and a wearable device are desired to be compact and have a complex exterior form. These electronic devices necessarily include secondary batteries. When the electronic device is reduced in size or formed to have a complex exterior form, an internal space of the electronic device where a secondary battery is to be placed decreases in volume or has a complex form.

A secondary battery used in a portable information terminal in general has a rectangular parallelepiped shape protected by a metal can or a hard resin.

The secondary battery having a rectangular parallelepiped shape is not flexible and therefore cannot utilize an internal space including curved surfaces of the electronic device with a complex exterior form efficiently.

Thus, a flexible secondary battery that can be changed in form is used for an electronic device with a complex exterior form so that the secondary battery can be efficiently placed in the internal space of the electronic device.

The term "electronic device with a complex exterior form" can be interpreted in many ways. It can be interpreted as an electronic device with a fixed complex exterior form (e.g., the form having a curved surface). In the case of fixing the form of the electronic device, a secondary battery is bent once and fixed while being bent. In addition, the term can also be interpreted as an electronic device with a complex exterior form that changes or does not change its form when external force is applied, or an electronic device with a simple exterior form that changes its form when external force is applied. In the case of an electronic device that changes its form when force is applied, it is preferable that a secondary battery also be able to change its form into a complex exterior form every time force is applied.

Examples of wearable devices include wearable input terminals such as a wearable camera, a wearable microphone, and a wearable sensor, wearable output terminals such as a wearable display and a wearable speaker, and wearable input/output terminals having the functions of any of the input terminals and any of the output terminals. Another example of a wearable device is a device that controls each device and calculates or processes data, typically, a wearable computer including a CPU. Other examples of wearable devices include devices that store data, send data, and receive data, typically, a portable information terminal and a memory.

The use of a film (also referred to as a laminate film) including a stack of metal foil (e.g., aluminum foil or stainless steel foil) and a resin (heat-seal resin) as an exterior body allows fabrication of a secondary battery that is thinner and more lightweight than a secondary battery using a metal can.

In a secondary battery using a laminated film, a positive electrode and a negative electrode are alternately stacked with a separator interposed therebetween. This stacked structure has an advantage over a generally known secondary battery in which a sheet-like positive electrode, separator, and negative electrode are wound because the structure is likely to release heat.

Since the laminated film is flexible, the positive electrode and the negative electrode include current collectors formed using thin metals, and the separator is formed using a thin resin, this secondary battery can be changed in form to have a complex exterior form when external force is applied.

As an example of a complex exterior form, the secondary battery can have a form with a curved surface, whereby the secondary battery can be efficiently placed in the internal space of the electronic device with a complex exterior form. In addition, an electronic device including a secondary battery in its internal space can be changed in form to have a complex exterior form.

Strong external force applied at the time of changing the exterior form into a complex form might bend the laminated film, the positive electrode, the separator, and the negative electrode beyond the limits.

Overbending breaks the laminated film, and the secondary battery cannot be restored to its original form. When the positive electrode, the negative electrode, and the like are broken and cut, the sharp cut surface breaks through the separator. In that case, the secondary battery cannot be used because of the internal short-circuit. Moreover, with a too small radius of curvature, stress applied to components of the secondary battery increases, and an active material might be peeled from the current collector, for example.

As electronic devices with a complex exterior form, products having a circular shape or arc-shape in use, such as a wristwatch or a bangle that can be bent and stretched, are considered.

A wristwatch and a bangle are used wound around the body. Therefore, when the secondary battery is placed in the internal space of the electronic device, the secondary battery is preferably able to bend so as to wind around a human arm.

When the wristwatch and the bangle are taken off the body, the degree of bending of the electronic device has to be reduced. Therefore, the secondary battery placed in the internal space of the electronic device is preferably able to loosen its curved form.

The wrist or arm is on the back side of the wristwatch or bangle when wearing it; therefore, the wristwatch or bangle is not bent beyond the limits and its radius of curvature does not become too small not as described above. However, when the wristwatch and the bangle are not used, strong external force is unintentionally applied to such an electronic device and the secondary battery placed in the internal space of the electronic device, and some problems might arise.

In order to prevent the problems from arising in the secondary battery placed in the internal space of the electronic device by strong external force applied unintentionally, the secondary battery may be protected with a material which is less likely to be changed in form by force than the laminated film, positive electrode, separator, and negative electrode included in the battery.

However, the above method also makes the secondary battery not to be easily bent; therefore, the secondary battery is not preferably used by being bent when the wristwatch and the bangle are put on or taken off.

The secondary battery has an internal structure including a positive electrode and a negative electrode with a separator interposed therebetween. Between this structure and an exterior body, a thermoplastic substance which becomes more flexible at around a temperature of a surface of human skin, that is, at higher than or equal to 30° C. and lower than or equal to 37° C., than at a room temperature (around 25° C.) is provided; for example, a thermoplastic resin having its glass transition temperature in the above temperature range is provided.

The thermoplastic substance in the secondary battery becomes more flexible by absorbing heat from a surface of human skin when the wristwatch or the bangle is wound around the body, so that the problem of the secondary battery that cannot be easily bent when it is wound does not arise. The thermoplastic substance has become flexible, which decreases the property of protecting against overbending by strong external force applied unintentionally and a too small radius of curvature. However, these problems can be prevented by the wrist or arm when the wristwatch and bangle are worn.

After the wristwatch and the bangle are taken off the body, the thermoplastic substance in the secondary battery loses heat given off from the surface of human skin and then becomes gradually rigid in a little while. When the wristwatch and the bangle are not used, the problems of bending beyond the limits by strong external force applied unintentionally and a too small radius of curvature arise more frequently than in the case where the wristwatch and the bangle are used. However, when the wristwatch and the bangle are not used, the thermoplastic substance is rigid and can protect the secondary battery.

Examples of the thermoplastic resin which has its glass transition temperature at around a temperature of a skin surface, at higher than or equal to 30° C. and lower than or equal to 37° C., include polyvinyl acetate whose glass transition temperature $T_g$ is around 31° C. Polyvinyl acetate becomes flexible by being heated to around 31° C. The material of the thermoplastic resin is not limited to a material whose glass transition temperature is in the above temperature range, as long as the material becomes flexible at around the temperature of a skin surface.

The thermoplastic substance is not limited to a homopolymer and may be a copolymer.

The thermoplastic substance may also be a substance to which a plasticizer or the like is added so as to control the glass transition temperature.

The thermoplastic substance might be in contact with an electrolyte solution because it is in the secondary battery. A thermoplastic substance resistant to an electrolyte solution needs to be selected or the thermoplastic substance needs to be prevented from being in contact with an electrolyte solution. For example, the thermoplastic substance is preferably covered with a high thermal conductive film resistant to an electrolyte solution.

The thermoplastic substance is placed between the exterior body and the structure including the positive electrode and the negative electrode with the separator interposed therebteween. The thermoplastic substance may be placed close to a human skin surface for efficient heat conduction. A plurality of thermoplastic substances can also be provided; in that case, heat is preferably conducted at the same time and in the same quantity.

The thermoplastic substance is not necessarily provided inside the secondary battery; for example, the thermoplastic substance may be provided outside an electronic device with a built-in secondary battery. The thermoplastic substance may be in direct contact with a human skin surface or provided with another substance interposed therebetween. The substance is preferably a material with high thermal conductivity.

One embodiment of the structure of the invention disclosed in this specification is a secondary battery which can be changed in form to have a curved surface with a radius of curvature of 30 mm, preferably with a radius of curvature of 10 mm. The secondary battery can also be changed in form to have a curved surface with a radius of curvature of 30 mm and then changed in form to have a curved surface with a radius of curvature of 150 mm.

The radius of curvature of a surface is described with reference to FIGS. 14A to 14C. In FIG. 14A, on a plane 1701 along which a curved surface 1700 is cut, part of a curve 1702 forming the curved surface 1700 is approximate to an arc of a circle; the radius of the circle is referred to as a radius of curvature 1703 and the center of the circle is referred to as a center of curvature 1704. FIG. 14B is a top view of the curved surface 1700. FIG. 14C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

In the case of bending a secondary battery in which a component 1805 including electrodes, an electrolytic solution, and the like is sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 15A). A value of the radius of curvature of a film close to the center of curvature is defined as the radius of curvature of the secondary battery.

Note that the cross-sectional shape of the secondary battery is not limited to a simple arc shape, and the cross section can be partly arc-shaped; for example, a shape illustrated in FIG. 15B, a wavy shape illustrated in FIG. 15C, or an S shape can be also used. When the curved surface of the secondary battery has a shape with a plurality of centers of curvature, the secondary battery can change its form such that a curved surface with the smallest radius of curvature among radii of curvature with respect to the plurality of centers of curvature, which is a surface of one of the two exterior bodies on the side closer to the center of curvature, has a curvature radius of 30 mm, preferably 10 mm.

A film used as the exterior body of the secondary battery is a single-layer film selected from a metal film (e.g., a foil of a metal such as aluminum, stainless steel, nickel steel, gold, silver, copper, titanium, nichrome, iron, tin, tantalum, niobium, molybdenum, zirconium, or zinc or an alloy thereof), a plastic film made of an organic material, a hybrid material film containing an organic material (e.g., an organic resin or fiber) and an inorganic material (e.g., ceramic), and a carbon-containing inorganic film (e.g., a carbon film or a graphite film) or a stacked-layer film including two or more of the above films. A metal film is easy to be embossed. Forming depressions or projections by embossing increases the surface area of the film exposed to outside air, achieving efficient heat dissipation.

A sealing structure of the secondary battery is as follows: one rectangular film is folded in half and sealed on three sides of four sides of the film except for one side that is a bent side with an adhesive layer, or two films are stacked so as to overlap with each other and sealed on four sides of the films with an adhesive layer.

The adhesive layer can be formed using a thermoplastic film material, a thermosetting adhesive, an anaerobic adhesive, a photo-curable adhesive such as a UV curable adhesive, or a reactive curable adhesive. Examples of materials of the adhesives include an epoxy resin, an acrylic resin, a silicone resin, and a phenol resin.

A secondary battery suitable for a portable information terminal or a wearable device is provided. A novel power storage device is provided.

An electronic device having a novel structure can be provided. Specifically, an electronic device having a novel structure that can be changed into various exterior forms can be provided. An electronic device having a novel structure that can have various exterior forms and a secondary battery that fits the forms of the electronic device can be provided.

The problem that strong external force unintentionally bends a secondary battery or an electronic device with a built-in secondary battery beyond the limits, resulting in a too small radius of curvature can be solved.

The form of a secondary battery can be freely designed; thus, when a secondary battery having a curved surface is used for example, the design flexibility of the whole electronic device is increased and electronic devices having a variety of designs can be fabricated. Furthermore, the secondary battery can be provided in the electronic device having a curved surface without a redundant space along the inner curved surface corresponding to the outer curved surface; thus, a space in the electronic device can be effectively used. For example, when the electronic device includes a flexible display portion having a certain size of area, there is a space having a certain size of area behind the display portion. The secondary battery of one embodiment of the present invention can effectively use the space having a certain size of area, in which case the secondary battery can be thin.

Thus, an electronic device having a novel structure can be provided.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIGS. 2A, 2A-1, 2A-2, 2B, 2B-1, 2B-2, 2C, 2C-1, and 2C-2 are perspective views and cross-sectional views illustrating one embodiment of the present invention;

FIGS. 4A, 4A-1 to 4A-3, 4B, and 4C are top views and cross-sectional views illustrating one embodiment of the present invention;

FIGS. 12A to 12 E illustrate electronic devices each including a flexible power storage battery of one embodiment of the present invention and power storage batteries;

DETAILED DESCRIPTION OF THE INVENTION

Figure 1A:
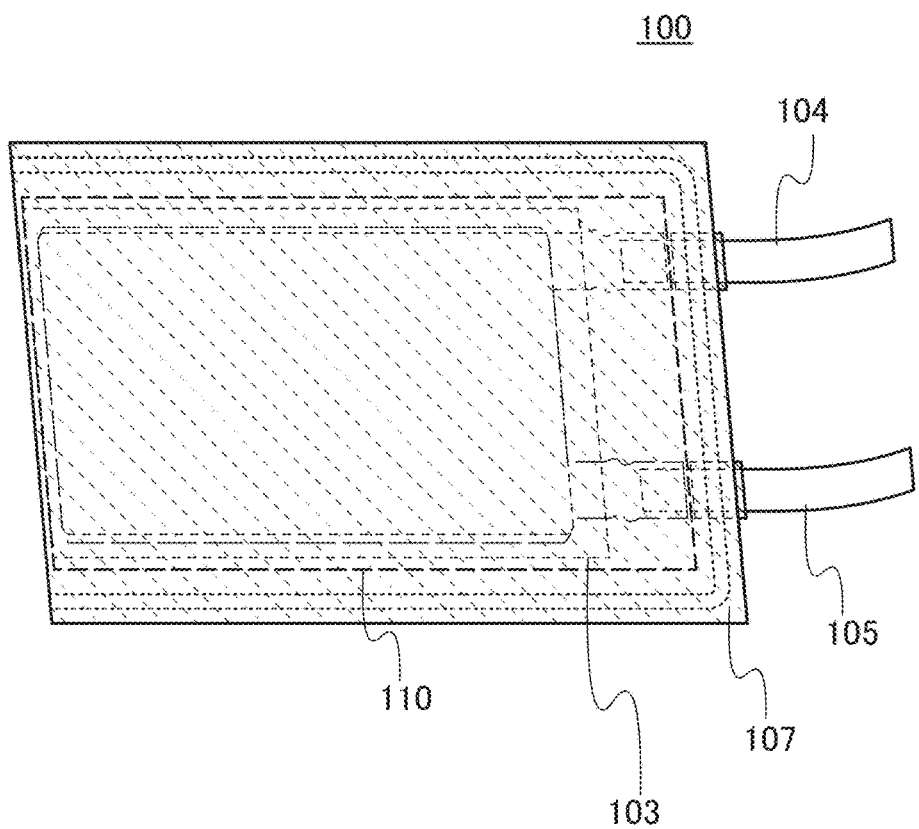
FIGS. 1A and 1B are a top view illustrating one embodiment of the present invention and a schematic view illustrating a current flow at the time of charging of a secondary battery.

Embodiments of the present invention will be described below in detail with reference to the drawings. Note that the present invention is not limited to the following description, and it is easily understood by those skilled in the art that modes and details disclosed herein can be modified in various ways. Furthermore, the present invention is not construed as being limited to description of the embodiments.

The term "electrically connected" includes the case where components are connected through an "object having any electric function. There is no particular limitation on the "object having any electric function" as long as electric signals can be transmitted and received between the components connected through the object.

The position, size, range, or the like of each component illustrated in drawings and the like is not accurately represented in some cases for easy understanding. Therefore, the disclosed invention is not necessarily limited to the position, size, range, or the like disclosed in the drawings and the like.

The ordinal number such as "first," "second," and "third" are used to avoid confusion among components.

In this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "substantially parallel" indicates that the angle formed between two straight lines is greater than or equal to 80° and less than or equal to 100°, and accordingly also includes the case where the angle is greater than or equal to 85° and less than or equal to 95°.

(Embodiment 1)

In this embodiment, a fabrication example of a secondary battery is described which has a structure including a positive electrode and a negative electrode with a separator interposed therebetween and includes, between the structure and an exterior body, a thermoplastic substance which becomes more flexible at around temperature of a human skin surface, that is, at higher than or equal to 30° C. and lower than or equal to 37° C., than at room temperature.

FIG. 1A illustrates an example of a schematic view of a secondary battery. FIG. 2A illustrates an example of an internal structure surrounded by an exterior body of the secondary battery.

A secondary battery 100 of one embodiment of the present invention includes at least a positive electrode 101, a separator 103, a negative electrode 102, a thermoplastic substance 110, and an electrolytic solution in an exterior body 107. The secondary battery can have any of a variety of structures, and a film is used for formation of the exterior body 107 in this embodiment.

A film used to form the exterior body 107 is a single-layer film selected from a metal film (e.g., a foil of a metal such as aluminum, stainless steel, nickel steel, gold, silver, copper, titanium, nichrome, iron, tin, tantalum, niobium, molybdenum, zirconium, or zinc or an alloy thereof), a plastic film made of an organic material, a hybrid material film containing an organic material (e.g., an organic resin or fiber) and an inorganic material (e.g., ceramic), and a carbon-containing inorganic film (e.g., a carbon film or a graphite film) or a stacked-layer film including two or more of the above films.

In this embodiment, a sheet-like thermoplastic substance is used as the thermoplastic substance 110 so as to cover a surface with the largest area of the positive electrode 101. However, the relation between the thermoplastic substance 110 and the surface with the largest area of the positive electrode 101 is not limited thereto. For example, the area of the positive electrode 101 may be larger than that of the thermoplastic substance 110. Furthermore, they may partly overlap with each other. The thermoplastic substance 110 is thicker than the separator 103 in this embodiment. The thermoplastic substance 110 may have a slit. The shape of the thermoplastic substance 110 is not limited to a rectangle and may have four rounded corners. If the shape of the thermoplastic substance 110 has a corner with an acute angle, the corner might damage the film serving as the exterior body when the secondary battery is bent. Thus, corners of the thermoplastic substance 110 are chamfered, so that the secondary battery can have high reliability. Any material can be used for the thermoplastic substance 110 as long as it becomes flexible at around temperature of a skin surface.

The thermoplastic substance 110 with a smooth surface can slide along the internal structure or exterior body that are in contact with the surface of the thermoplastic substance 110; thus, the secondary battery can be resistant to repeated bending.

Note that the term "positive electrode 101" includes a positive electrode including a current collector (e.g., aluminum) whose one surface or both surfaces are provided with a positive electrode active material layer and the like. The term "negative electrode 102" includes a negative electrode including a current collector (e.g., copper) whose one surface or both surfaces are provided with a negative electrode active material layer and the like. The positive electrode 101 is electrically connected to a positive electrode lead 104. The negative electrode 102 is electrically connected to a negative electrode lead 105. Each of the positive electrode lead 104 and the negative electrode lead 105 is also referred to as a lead electrode or a lead terminal. Parts of the positive electrode lead 104 and the negative electrode lead 105 are positioned outside the exterior body. The secondary battery 100 is charged and discharged through the positive electrode lead 104 and the negative electrode lead 105.

Here, a current flow at the time of charging a secondary battery will be described with reference to FIG. 1B. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" or a "plus electrode" and the negative electrode is referred to as a "negative electrode" or a "minus electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, whether it is at the time of charging or discharging is noted and whether it corresponds to a positive electrode or a negative electrode is also noted.

Figure 1B:
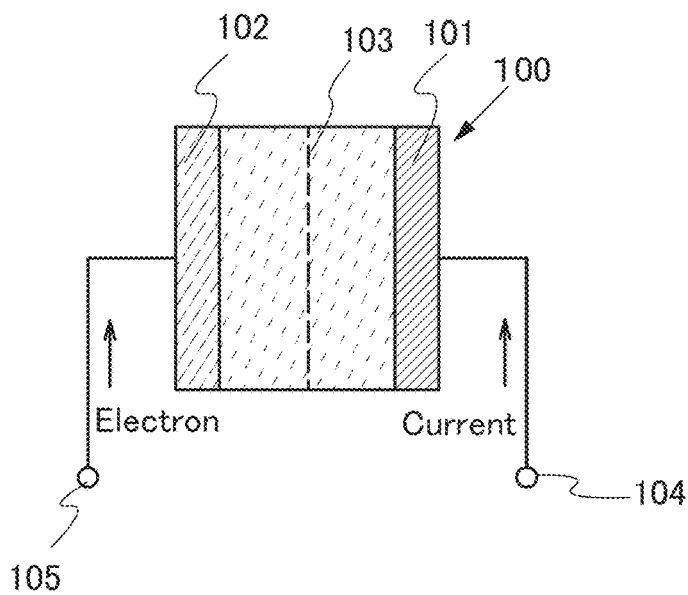

Two terminals in FIG. 1B are connected to a charger, and a secondary battery 100 is charged. As charging of the secondary battery 100 proceeds, a potential difference between electrodes increases. The positive direction in FIG. 1B is the direction in which a current flows from one terminal (positive electrode lead 104) outside the secondary battery 100 to a positive electrode current collector (positive electrode 101), flows from the positive electrode 101 to the negative electrode 102 in the secondary battery 100, and flows from the negative electrode to the other terminal (negative electrode lead 105) outside the secondary battery 100. In other words, a current flows in the direction of a flow of a charging current.

In this embodiment, the example in which one pair of the positive electrode 101 and the negative electrode 102 is provided in the exterior body 107 is described for simplicity. However, a plurality of pairs of the positive electrode 101 and the negative electrode 102 may be provided in the exterior body 107 to increase the capacity of the secondary battery.

FIG. 2A illustrates an example of arrangement in the exterior body 107; the thermoplastic substance 110, the positive electrode 101, the separator 103, and the negative electrode 102 are arranged. Note that the exterior body 107, the positive electrode lead 104, and the negative electrode lead 105 are not illustrated in FIG. 2A for simplicity.

FIG. 2A-1 is a cross-sectional view taken along dashed-dotted line A-A' in FIG. 2A. FIG. 2A-2 is a cross-sectional view taken along dashed-dotted line B-B' in FIG. 2A. The positive electrode 101, the separator 103, and the negative electrode 102 are provided over the thermoplastic substance 110. The thermoplastic substance 110 is the widest component in the cross section along A-A' and the cross section along B-B'. The thermoplastic substance 110 is formed so as to be larger and wider than the separator 103 by about 5%, for example.

In addition, the negative electrode 102 is slightly wider than the positive electrode 101 in the cross section along A-A' and the cross section along B-B'. The negative electrode 102 is formed so as to be larger and wider than the positive electrode 101 by about 5%, for example.

Furthermore, the separator 103 is slightly wider than the negative electrode 102 in the cross section along A-A' and the cross section along B-B'. The separator 103 is formed so as to be larger and wider than the negative electrode 102 by about 5%, for example.

The thermoplastic substance 110 which is formed larger than the separator 103 can solve the problem, that is, can prevent a secondary battery or an electronic device with a built-in secondary battery from being bent beyond the limits by strong external force applied unintentionally and its radius of curvature from becoming too small.

Note that the thermoplastic substance 110 is not necessarily larger than the separator 103 in order to achieve the above effect. The area of the separator 103 may be larger than that of the thermoplastic substance 110; furthermore, they may partly overlap with each other. The sizes can be changed because of designing of the secondary battery or the electronic device.

At the time of charging of the secondary battery, lithium ions are released from the positive electrode 101 and inserted into the negative electrode 102. The negative electrode 102 which is formed larger than the positive electrode 101 can insert lithium ions efficiently thereinto so as to prevent lithium from depositing on a surface of the negative electrode 102.

As a material of the separator 103, a porous insulator such as cellulose (paper), nanocellulose, cellulose nanofiber, polypropylene (PP), polyethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm in which a glass fiber and a polymer fiber are mixed may be used.

In this embodiment, the structure of the secondary battery is as follows, for example: the thickness of the separator 103 is approximately 15 µm to 30 µm; the thickness of a current collector in the positive electrode 101 is approximately 10 µm to 40 µm; the thickness of a positive electrode active material layer is approximately 50 µm to 100 µm; the thickness of a negative electrode active material layer is approximately 50 µm to 100 µm; and the thickness of a current collector in the negative electrode 102 is approximately 5 µm to 40 µm.

Although a sheet-like separator may be used as the separator 103 in FIG. 2A, a bag-like one may alternatively be used. Furthermore, one separator may be bent and provided in the exterior body 107 such that the positive electrode (or the negative electrode) is located between facing surfaces of the bent separator.

Figure 16A:
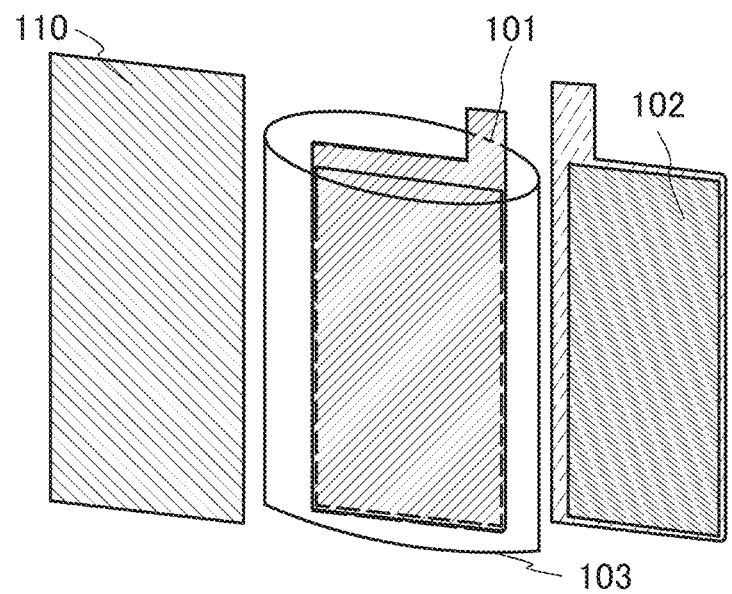
FIGS. 16A and 16B are perspective views illustrating one embodiment of the present invention.

FIG. 16A illustrates an example of using a bag-like separator 103. The positive electrode 101 is put into the bag-like separator 103 from its opened mouth, and then the opened mouth is sealed by thermal welding. As the thermal welding, the opened mouth of the bag can be entirely sealed linearly or partly sealed in a dashed line along which a sealed portion and a non-sealed portion are alternately provided at intervals of 1 cm. With such a structure, the electrolyte solution can be well impregnated into the positive electrode 101 in the bag-like separator 103.

Figure 16B:
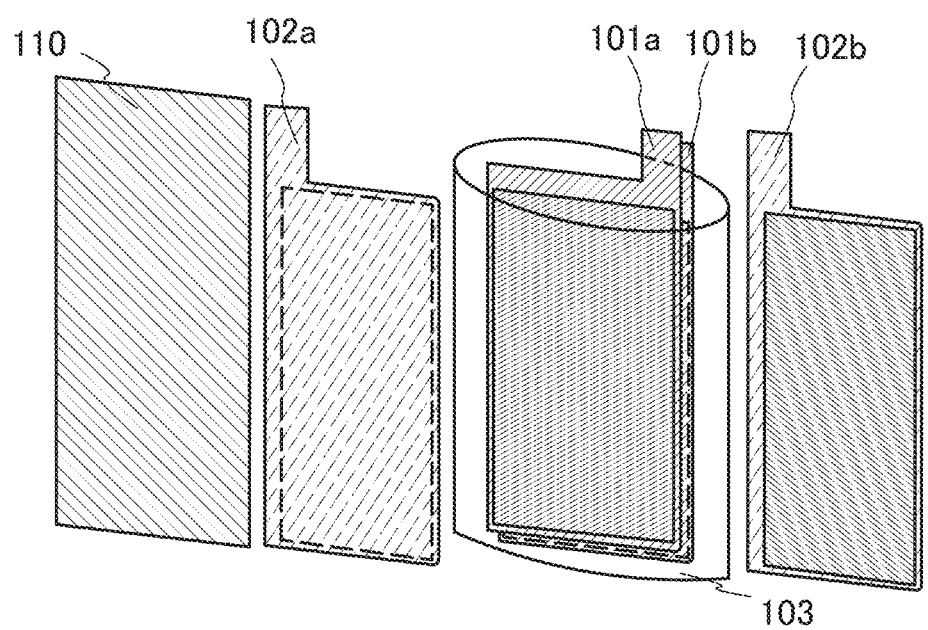

FIG. 16B illustrates an example of forming two positive electrodes 101a and 101b and two negative electrodes 102a and 102b with the bag-like separator 103. The two positive electrodes 101a and 101b are in one bag-like separator 103.

Each of the positive electrodes 101a and 101b and the negative electrodes 102a and 102b can be provided with active materials on its both surface (hereinafter, also expressed as double-side coating). In the structure in FIG. 16B, one surface of each of the positive electrodes 101a and 101b can be provided with an active material (hereinafter, also expressed as single-side coating) and then the other surfaces which are not provided with active materials of the positive electrodes 101a and 101b can face each other. As compared to the cases where active material surfaces of the adjacent positive electrodes (for example, active material surfaces of double-side coated positive electrodes 101a and 101b) are in contact with each other or where an active material surface and a metal surface (for example, an active material surface of the double-side coated positive electrode 101a and a metal surface of the positive electrode 101b) are in contact with each other, coefficient of static friction is low in the case where metal surfaces of the adjacent positive electrodes (for example, metal surfaces of the positive electrodes 101a and 101b) are in contact with each other. Stress generated in the secondary battery changing its form can be relieved because the metal surface of the positive electrode 101a and the adjacent metal surface of the positive electrode 101b slide at the surface where they are in contact with each other.

The structure in FIG. 16B can also be a structure in which the negative electrodes 102a and 102b are single-side coated, and one surface of the negative electrode 102a which is not provided with the active material faces the thermoplastic substance 110 and one surface of the negative electrode 102b which is not provided with the active material faces a surface of an exterior body which is not illustrated. As compared to the cases where an active material surface (for example, an active material surface of a double-side coated negative electrode 102a) is in contact with the thermoplastic substance 110 or where an active material surface (for example, an active material surface of a double-side coated negative electrode 102b) is in contact with the exterior body, coefficient of static friction is low in the cases where a metal surface (for example, a metal surface of the negative electrode 102a) is in contact with the thermoplastic substance 110 or where a metal surface (for example, a metal surface of the negative electrode 102b) is in contact with the exterior body. Stress generated in the secondary battery changing its form can be relieved because the metal surface of the negative electrode 102a and the thermoplastic substance 110 slide at the surface where they are in contact with each other and the metal surface of the negative electrode 102b and the exterior body slide at the surface where they are in contact with each other.

The position of the thermoplastic substance 110 is not limited to that in FIG. 2A. For example, the thermoplastic substance 110 may be provided on the side in contact with the negative electrode 102 as illustrated in FIG. 2B. Depending on the design for the electronic devices, the thermoplastic substance 110 may be placed closer to a human skin surface for efficient heat conduction. FIGS. 2B-1 and 2B-2 show cross sections along A-A' and B-B' in FIG. 2B, respectively. The idea about the designed sizes of them is similar to that of FIGS. 2A-1 and 2A-2.

The number of the thermoplastic substances 110 is not necessarily one and may be more than one. For example, the positive electrode 101, the separator 103, and the negative electrode 102 may be provided between a first thermoplastic substance 110a and a second thermoplastic substance 110b as illustrated in FIG. 2C. In that case, they may be arranged so that heat can be conducted to a plurality of thermoplastic substances at the same time and in the same quantity. FIGS. 2C-1 and 2C-2 show cross sections along A-A' and B-B' in FIG. 2C, respectively. The idea about the designed sizes of them is similar to that of FIGS. 2A-1 and 2A-2.

Examples of positive electrode active materials that can be used for the positive electrode active material layer of the secondary battery 100 include a composite oxide with an olivine structure, a composite oxide with a layered rock-salt structure, and a composite oxide with a spinel structure. As the positive electrode active material, a compound such as $LiFeO_2$, $LiCoO_2$, $LiNiO_2$, $LiMn_2O_4$, $V_2O_5$, $Cr_2O_5$, and $MnO_2$ can be used.

Alternatively, a complex material $LiMPO_4$ (general formula, where M is one or more of Fe(II), Mn(II), Co(II), and Ni(II)) can be used. Typical examples of $LiMPO_4$ are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a complex material such as $Li_{2-j}MSiO_4$ (general formula, where M is one or more of Fe(II), Mn(II), Co(II), and Ni(II); 0≤j≤2) can be used. Typical examples of $Li_{2-j}MSiO_4$ are lithium compounds such as $Li_{2-j}FeSiO_4$, $Li_{2-j}NiSiO_4$, $Li_{2-j}CoSiO_4$, $Li_{2-j}MnSiO_4$, $Li_{2-j}Fe_kNi_lSiO_4$, $Li_{2-j}Fe_kCo_lSiO_4$, $Li_{2-j}Fe_kMn_lSiO_4$, $Li_{2-j}Ni_kCo_lSiO_4$, $Li_{2-j}Ni_kMn_lSiO_4$ (k+l≤1, 0<k<1, and 0<l<1), $Li_{2-j}Fe_mNi_nCo_qSiO_4$, $Li_{2-j}Fe_mNi_nMn_qSiO_4$, $Li_{2-j}Ni_mCo_nMn_qSiO_4$ (m+n+q≤1, 0<m<1, 0<n<1, and 0<q<1), and $Li_{2-j}Fe_rNi_sCo_tMn_uSiO_4$ (r+s+t+u≤1, 0<r<1, 0<s<1, 0<t<1, and 0<u<1).

Still alternatively, a nasicon compound represented by $A_xM_2(XO_4)_3$ (general formula, where A=Li, Na, or Mg, M=Fe, Mn, Ti, V, Nb, or Al, X=S, P, Mo, W, As, or Si) can be used as the positive electrode active material. Examples of the nasicon compound are $Fe_2(MnO_4)_3$, $Fe_2(SO_4)_3$, and $Li_3Fe_2(PO_4)_3$. Still further alternatively, compounds represented by $Li_2MPO_4F$, $Li_2MP_2O_7$, and $Li_5MO_4$ (general formulae, where M=Fe or Mn), a perovskite fluoride such as $NaFeF_3$ and $FeF_3$, a metal chalcogenide (a sulfide, a selenide, and a telluride) such as $TiS_2$ and $MoS_2$, an oxide with an inverse spinel crystal structure such as $LiMVO_4$, a vanadium oxide (e.g., $V_2O_5$, $V_6O_{13}$, and $LiV_3O_8$), a manganese oxide, and an organic sulfur compound can be used as the positive electrode active material, for example.

In addition, a lithium-manganese composite oxide that is represented by the compositional formula: $Li_aMn_bM_cO_d$, can be used as the positive electrode active material. Here, the element M is preferably a metal element other than lithium and manganese, or silicon or phosphorus, further preferably nickel. Furthermore, it is preferable to satisfy the following at the time of discharging: 0<a/(b+c)<2; c>0; and 0.26≤(b+c)/d<0.5 when a whole particle of lithium-manganese composite oxide is measured. Note that composition of the metal, silicon, phosphorus, or the like of a whole particle of lithium-manganese composite oxide can be measured with an inductively coupled plasma mass spectrometer (ICP-MS), for example. The composition of oxygen of the whole particle of lithium-manganese composite oxide can be measured with an energy dispersive X-ray spectrometer (EDX) for example, or can be obtained using valence analysis by gas fusion analysis or x-ray absorption fine structure (XAFS) analysis together with ICP-MS analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

In the lithium-manganese composite oxide, a superficial portion and a center portion preferably include regions having different crystal structures, crystal orientation, or oxygen content for higher capacity. The compositional formula of such a lithium-manganese composite oxide is preferably $Li_aMn_bNi_cO_d$ in the following range: 1.6≤a≤1.848, 0.19≤c/b≤0.935, 2.5≤d≤3. Specifically, the lithium-manganese composite oxide represented by the compositional formula: $Li_{1.68}Mn_{0.8062}Ni_{0.318}O_3$, is further preferably used. In this specification and the like, a lithium-manganese composite oxide represented by the composition formula: $Li_{1.68}Mn_{0.8062}Ni_{0.318}O_3$, refers to that formed at a ratio (molar ratio) of the amounts of raw materials of $Li_2CO_3$: $MnCO_3$:NiO=0.84:0.8062:0.318. Although this lithium-manganese composite oxide is represented by the composition formula: $Li_{1.68}Mn_{0.8062}Ni_{0.318}O_3$, the composition might be different in some cases.

Figure 3A:
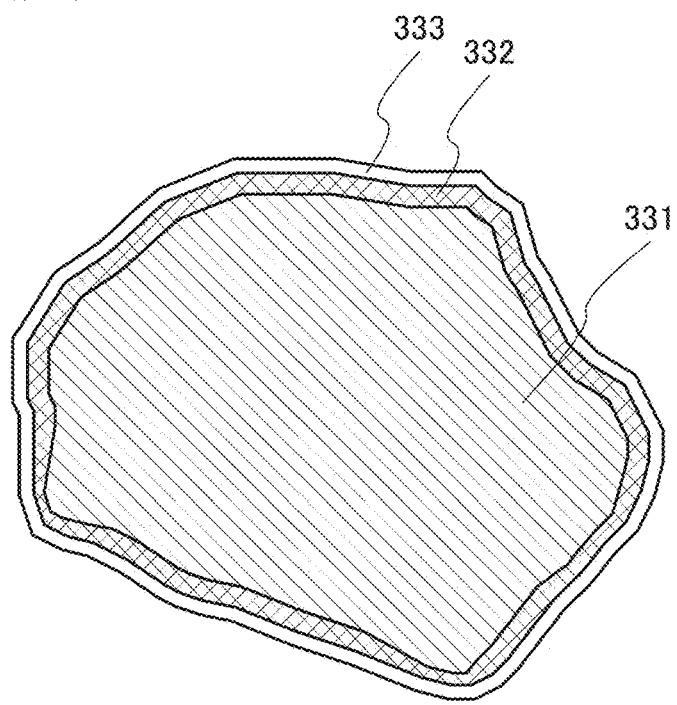
FIGS. 3A and 3B each illustrate a particle of one embodiment of the present invention.
Figure 3B:
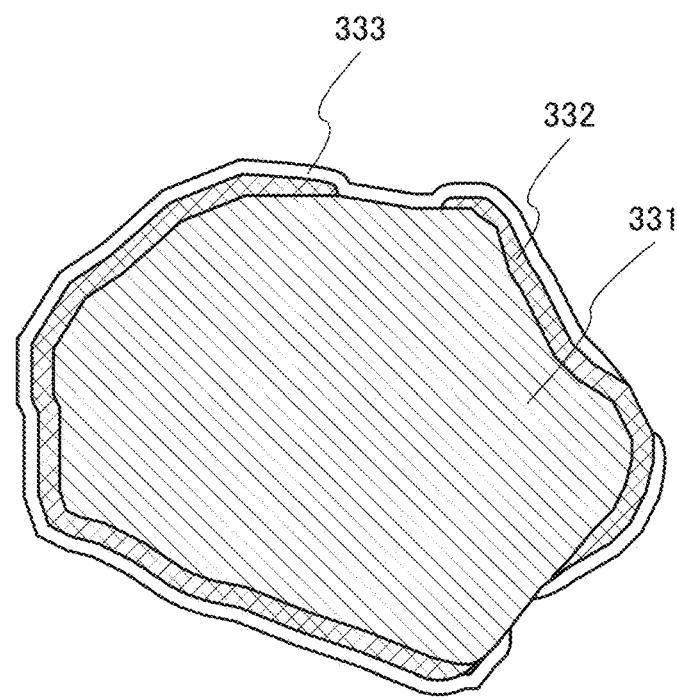

FIGS. 3A and 3B illustrate examples of cross sections of particles of the lithium-manganese composite oxide including regions which have different crystal structures, crystal orientation, or oxygen content.

As illustrated in FIG. 3A, a lithium-manganese composite oxide including regions which have different crystal structures, crystal orientation, or oxygen content preferably includes a first region 331, a second region 332, and a third region 333. The second region 332 is in contact with at least part of the outside of the first region 331. Here, the term "outside" refers to the side closer to a surface of a particle. The third region 333 preferably includes a region corresponding to the surface of a particle including the lithium-manganese composite oxide.

As shown in FIG. 3B, the first region 331 may include a region not covered with the second region 332. The second region 332 may include a region not covered with the third region 333. For example, the first region 331 may include a region in contact with the third region 333. The first region 331 may include a region covered with neither the second region 332 nor the third region 333.

The second region 332 preferably has composition different from that of the first region 331.

For example, the case is described where the first region 331 contains manganese, the element M, and oxygen; the second region 332 contains manganese, the element M, and oxygen; the atomic ratio of manganese, the element M and oxygen in the first region 331 is represented by b1:c1:d1; and the atomic ratio of manganese, the element M and oxygen in the second region 332 is represented by b2:c2:d2 by separately measuring the compositions in the first region 331 and the second region 332.

Note that the composition of each of the first region 331 and the second region 332 can be measured by energy dispersive X-ray spectroscopy (EDX) using a transmission electron microscope (TEM). Since it is difficult to measure the composition of lithium by EDX, a difference between the composition of the elements other than lithium in the first region 331 and that in the second region 332 is described. Here, d1/(b1+c1) is preferably greater than or equal to 2.2, further preferably greater than or equal to 2.3, still further preferably greater than or equal to 2.35 and less than or equal to 3. Furthermore, d2/(b2+c2) is preferably less than 2.2, further preferably less than 2.1, still further preferably greater than or equal to 1.1 and less than or equal to 1.9. In this case, the composition of the whole particle of lithium-manganese composite oxide including the first region 331 and the second region 332 also preferably satisfies the above inequality: 0.26≤(b+c)/d<0.5.

For example, the case is described where the first region 331 contains lithium, manganese, the element M, and oxygen; the second region 332 contains lithium, manganese, the element M, and oxygen; the atomic ratio of lithium, manganese, the element M, and oxygen in the first region 331 is represented by a1:b1:c1:d1; and the atomic ratio of lithium, manganese, the element M, and oxygen in the second region 332 is represented by a2:b2:c2:d2 by separately measuring the compositions in the first region 331 and the second region 332. Note that the composition of each of the first region 331 and the second region 332 can be measured by energy dispersive X-ray spectroscopy (EDX) using a transmission electron microscope (TEM). Since it is difficult to measure the composition of lithium by EDX in some cases, a difference between the composition of the elements other than lithium in the first region 331 and that in the second region 332 is described below. Here, d1/(b1+c) is preferably greater than or equal to 2.2, further preferably greater than or equal to 2.3, still further preferably greater than or equal to 2.35 and less than or equal to 3. Furthermore, d2/(b2+c2) is preferably less than 2.2, further preferably less than 2.1, still further preferably greater than or equal to 1.1 and less than or equal to 1.9. In this case, the composition of the whole particle of lithium-manganese composite oxide including the first region 331 and the second region 332 also preferably satisfies the above inequality: 0.26≤(b+c)/d<0.5.

The valence of manganese in the second region 332 may be different from that of manganese in the first region 331. The valence of the element M in the second region 332 may be different from that of the element M in the first region 331.

Specifically, the first region 331 is preferably a lithium-manganese composite oxide having a layered rock-salt crystal structure. The second region 332 is preferably a lithium-manganese composite oxide having a spinel crystal structure.

Here, in the case where the composition of the regions or valences of elements in the regions are spatially distributed, the composition or valences in a plurality of portions are obtained, the average values thereof are calculated, and the average values are regarded as the composition or valences of the regions, for example.

A transition layer may be provided between the second region 332 and the first region 331. Here, the transition layer is a region where composition is changed continuously or gradually, a region where a crystal structure is changed continuously or gradually, or a region where the lattice constant of a crystal is changed continuously or gradually. A mixed layer may be provided between the second region 332 and the first region 331. The mixed layer is a layer in which, for example, two or more crystals having different crystal orientations are mixed, two or more crystals having different crystal structures are mixed, or two or more crystals having different compositions are mixed.

Carbon or a metal compound can be used for the third region 333. Examples of the metal include cobalt, aluminum, nickel, iron, manganese, titanium, zinc, and lithium. As an example of the metal compound, an oxide of the metal, a fluoride of the metal, or the like can be given.

In particular, the third region 333 preferably contains carbon among the above. Since carbon has high conductivity, the particle coated with carbon in the electrode of the secondary battery can reduce the resistance of the electrode, for example. Since the third region 333 contains carbon, the second region 332 which is in contact with the third region 333 can be oxidized. The third region 333 may contain graphene, graphene oxide, or graphene oxide subjected to reduction. Graphene and reduced graphene oxide have excellent electrical characteristics of high conductivity and excellent physical properties of high flexibility and high mechanical strength. The particle of lithium-manganese composite oxide can be efficiently coated.

The third region 333 contains carbon such as graphene, whereby a secondary battery using the lithium-manganese composite oxide for its positive electrode material can have an improved cycle life.

The thickness of the layer containing carbon is preferably greater than or equal to 0.4 nm and less than or equal to 40 nm.

Furthermore, the average size of primary particles of the lithium-manganese composite oxide is preferably greater than or equal to 5 nm and less than or equal to 50 μm, further preferably greater than or equal to 100 nm and less than or equal to 500 nm, for example. The specific surface area is preferably greater than or equal to 5 m$^2$/g and less than or equal to 15 m$^2$/g. The average size of secondary particles is preferably greater than or equal to 5 μm and less than or equal to 50 μm. Note that the average particle sizes can be measured with a particle size distribution analyzer or the like using a laser diffraction and scattering method or by observation with a scanning electron microscope (SEM) or a TEM. The specific surface area can be measured by a gas adsorption method.

The positive electrode active material layer may further include a binder for increasing adhesion of active materials, a conductive additive for increasing the conductivity of the positive electrode active material layer, and the like in addition to the above-described positive electrode active materials.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material.

For the electrolytic solution, a material that has carrier ion mobility and contains lithium ions serving as carrier ions is used as its electrolyte. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone or two or more of them may be used in an appropriate combination and in an appropriate ratio.

As a solvent of the electrolytic solution, a material with the carrier ion mobility is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the secondary battery can be thinner and more lightweight. Typical examples of the gelled high-molecular material include a silicone gel, an acrylic gel, an acrylonitrile gel, a poly(ethylene oxide)-based gel, a poly(propylene oxide)-based gel, a gel of a fluorine-based polymer, and the like. Alternatively, the use of one or more of ionic liquids (room temperature molten salts) which have features of non-flammability and non-volatility as a solvent of the electrolytic solution can prevent the secondary battery from exploding or catching fire even when the secondary battery internally shorts out or the internal temperature increases owing to overcharging or the like. An ionic liquid is a salt in the fluid state and has high ion mobility (conductivity). Furthermore, the ionic liquid includes a cation and an anion. Examples of such an ionic liquid are an ionic liquid containing an ethylmethylimidazolium (EMI) cation and an ionic liquid containing an N-methyl-N-propylpiperidinium ($PP_{13}$) cation.

Instead of the electrolytic solution, a solid electrolyte containing an inorganic material such as a sulfide-based inorganic material or an oxide-based inorganic material, or a solid electrolyte containing a high-molecular material such as a polyethylene oxide (PEO)-based high-molecular material may alternatively be used. In the case of using the solid electrolyte, a separator or a spacer is not necessary. Furthermore, the battery can be entirely solidified; therefore, there is no possibility of liquid leakage and thus the safety of the battery is dramatically increased.

A material with which lithium can be dissolved and precipitated or a material into and from which lithium ions can be inserted and extracted can be used for a negative electrode active material used in the negative electrode active material layer in the secondary battery 100; for example, a lithium metal, a carbon-based material, an alloy-based material, or the like can be used.

The lithium metal is preferable because of its low redox potential (lower than a redox potential of a standard hydrogen electrode by 3.045 V) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active material, an alloy-based material which enables charge-discharge reaction by an alloying reaction and a dealloying reaction with lithium can be used. In the case where carrier ions are lithium ions, a material containing at least one of Al, Si, Ge, Sn, Pb, Sb, Bi, Ag, Au, Zn, Cd, In, Ga, and the like can be used as such an alloy-based material, for example. Such elements have higher capacity than carbon. In particular, silicon has a significantly high theoretical capacity of 4200 mAh/g. For this reason, silicon is preferably used as the negative electrode active material. Examples of an alloy-based material including such elements are $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Note that SiO refers to the powder of a silicon oxide including a silicon-rich portion and can also be referred to as $SiO_y$, (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten dioxide ($WO_2$), or molybdenum dioxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 $mAh/cm^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions for a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used for a positive electrode active material because of its high potential.

The negative electrode active material layer may further include a binder for increasing adhesion of active materials, a conductive additive for increasing the conductivity of the negative electrode active material layer, and the like in addition to the above-described negative electrode active materials.

Although an example of a small battery used in a portable information terminal or the like is described in this embodiment, one embodiment of the present invention is not particularly limited to this example. Application to a large battery provided in a vehicle or the like is also possible.

In this embodiment, one embodiment of the present invention has been described. Other embodiments of the present invention are described in the other embodiments. Note that one embodiment of the present invention is not limited to the above examples. That is, since various embodiments of the present invention are disclosed in this embodiment and the other embodiments, one embodiment of the present invention is not limited to a specific embodiment. The example in which one embodiment of the present invention is applied to a lithium-ion secondary battery is described; however, one embodiment of the present invention is not limited thereto. Depending on circumstances or conditions, one embodiment of the present invention can be applied to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a zinc air battery, and a lithium air battery; a primary battery; a capacitor such as an electric double layer capacitor, an ultracapacitor, a supercapacitor, and a lithium ion capacitor; and the like. Alternatively, for example, depending on circumstances or conditions, one embodiment of the present invention is not necessarily applied to a lithium-ion secondary battery. The example in which a power storage device is changed in form is described as one embodiment of the present invention; however, one embodiment of the present invention is not limited thereto. Depending on circumstances or conditions, in one embodiment of the present invention, a power storage device is not changed in form or is not bent. Alternatively, depending on circumstances or conditions, one embodiment of the present invention is a power storage device with a flat plate shape without being changed in form. The example in which the power storage device is provided with the thermoplastic substance 110 and the like is described as one embodiment of the present invention; however, one embodiment of the present invention is not limited thereto. Depending on circumstances or conditions, one embodiment of the present invention may be a power storage device which is provided with substances having a variety of properties. Alternatively, depending on circumstances or conditions, the thermoplastic substance may have a property other than the thermoplastic property in one embodiment of the present invention.

This embodiment can be freely combined with any of the other embodiments.

(Embodiment 2)

In Embodiment 1, the sheet-like thermoplastic substance is used. In this embodiment, a thermoplastic substance having a shape different from that in Embodiment 1 is used and provided at a position different from that in Embodiment 1.

Figure 4A:
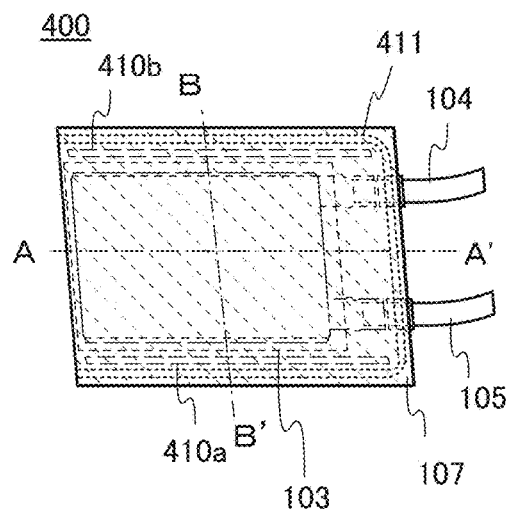
Figure 4A:
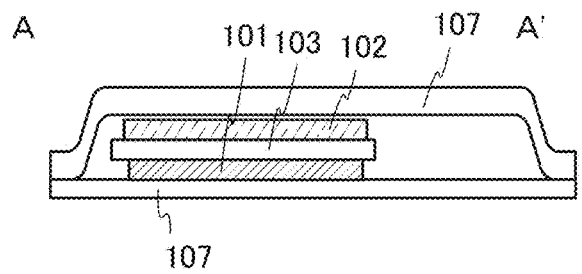
Figure 4A:
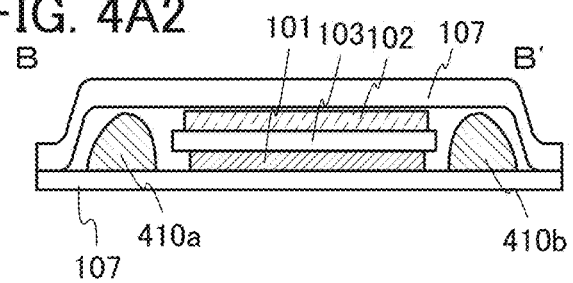
Figure 4A:
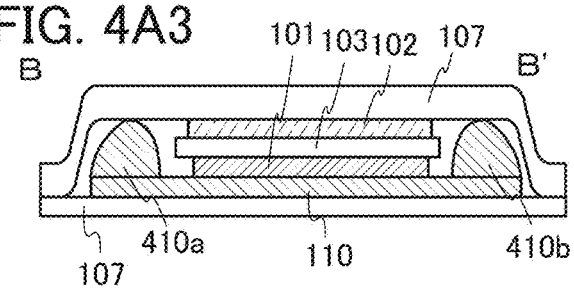
Figure 4B:
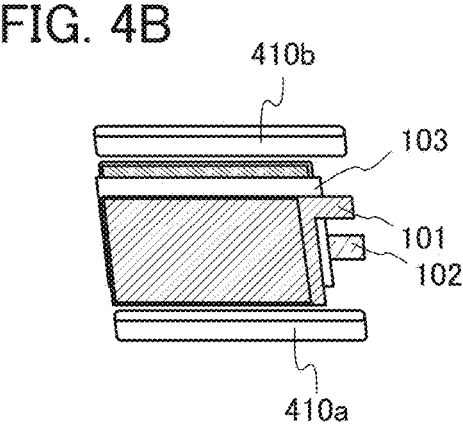

FIG. 4A illustrates an example of a schematic view of a secondary battery. FIG. 4B illustrates an example of an internal structure surrounded by an exterior body of a secondary battery. Note that in FIGS. 4A, 4A-1 to 4A-3, 4B, and 4C, the same reference numerals are used for the same parts as those in FIGS. 1A and 1B, and detailed description of the parts is omitted here for simplicity.

A secondary battery 400 of one embodiment of the present invention includes at least the positive electrode 101, the separator 103, the negative electrode 102, a first thermoplastic substance 410a, a second thermoplastic substance 410b, and the electrolytic solution in the exterior body 107.

A bar-like thermoplastic substance that is thicker than the separator 103 is used as each of the first thermoplastic substance 410a and the second thermoplastic substance 410b in this embodiment.

As illustrated in FIGS. 4A and 4B, the positive electrode 101, the separator 103, and the negative electrode 102 are positioned between the first thermoplastic substance 410a and the second thermoplastic substance 410b.

Facing outer edges of the exterior body 107 are bonded by thermocompression bonding. An adhesive region 411 is a region subjected to the thermocompression bonding. A surface of a film used for the exterior body 107 is provided with a polypropylene layer, and only the portion subjected to thermocompression bonding becomes an adhesive region.

When the first thermoplastic substance 410a and the second thermoplastic substance 410b are positioned between the adhesive region 411 and a stack of the positive electrode 101, the separator 103, and the negative electrode 102, a cross section is formed so as to have a gentle difference in level between at a region of the exterior bodies 107 overlapping with the adhesive region 411 and at a region of the exterior bodies 107 provided with the stack interposed therebetween.

Any material can be used for the first thermoplastic substance 410a and the second thermoplastic substance 410b as long as they become flexible at around a skin surface temperature. The thermoplastic substance might be in contact with an electrolyte solution because of the placement in the secondary battery. A thermoplastic substance having high resistance against an electrolyte solution is necessarily selected or the thermoplastic substance is required not to be in contact with an electrolyte solution. For example, the thermoplastic substance is preferably coated with a high thermal conductive film having resistance against an electrolyte solution.

The provided first thermoplastic substance 410a and second thermoplastic substance 410b can suppress generation of wrinkles on the film serving as the exterior body in the outer edge of the secondary battery 400 even when the secondary battery 400 is bent.

When a plurality of stacks each including the positive electrode 101, the separator 103, and the negative electrode 102 are stored in the exterior body to increase the capacity of the secondary battery 400, the total thickness increases. An increased difference in level between the stacked region and the outer edge forms a difference in level on the film serving as the exterior body. The first thermoplastic substance 410a and the second thermoplastic substance 410b are preferably provided so as to make this difference in level small.

FIG. 4A-1 is a cross-sectional view taken along dashed-dotted line A-A' in FIG. 4A.

The negative electrode 102 is slightly wider than the positive electrode 101 in the cross section along A-A'. The negative electrode 102 is formed so as to be larger and wider than the positive electrode 101 by about 5%, for example.

The separator 103 is slightly wider than the negative electrode 102 in the cross section along A-A'. The separator 103 is formed so as to be wider than the negative electrode 102 by about 5%, for example.

FIG. 4A-2 is a cross-sectional view taken along dashed-dotted line B-B' in FIG. 4A. The positive electrode 101, the separator 103, and the negative electrode 102 are positioned between the first thermoplastic substance 410a and the second thermoplastic substance 410b.

The first thermoplastic substance 410a and second thermoplastic substance 410b are preferably formed to have a height similar to that of the stack of the positive electrode 101, the separator 103, and the negative electrode 102. The cross section is preferably formed so as to have a gentle difference in level between at a region of the upper exterior body 107 overlapping with the adhesive region 411 and at a region of the upper exterior body 107 overlapping with the stack including the positive electrode 101, the separator 103, and the negative electrode 102. The first thermoplastic substance 410a and the second thermoplastic substance 410b might be in contact with the upper exterior body 107; therefore, if they have no angled portions but smooth curved surfaces, the exterior body can be prevented from being damaged.

FIG. 4A-3 is a cross-sectional view, taken along dashed-dotted line B-B' in FIG. 4A, of an example of an embodiment in which the thermoplastic substance 110 described in Embodiment 1 is combined with the structure in FIG. 4A. Over the thermoplastic substance 110, the first thermoplastic substance 410a and the second thermoplastic substance 410b are provided, and the positive electrode 101, the separator 103, and the negative electrode 102 are positioned between the first thermoplastic substance 410a and the second thermoplastic substance 410b.

Figure 4C:
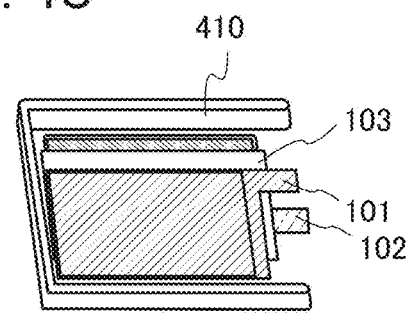

Although the two thermoplastic substances, the first thermoplastic substance 410a and the second thermoplastic substance 410b, are used as an example, one embodiment of the present invention is not particularly limited thereto. One U-shaped thermoplastic substance 410 can be used, an example of which is illustrated in FIG. 4C. Alternatively, one frame-like thermoplastic substance can be used.

This embodiment can be freely combined with any of the other embodiments.

(Embodiment 3)

As one embodiment of the present invention, an example of a thermoplastic substance provided over a surface of an electronic device including a secondary battery will be described. The structure of this embodiment can be combined with any of the structures described in the other embodiments as appropriate.

Figure 5A:
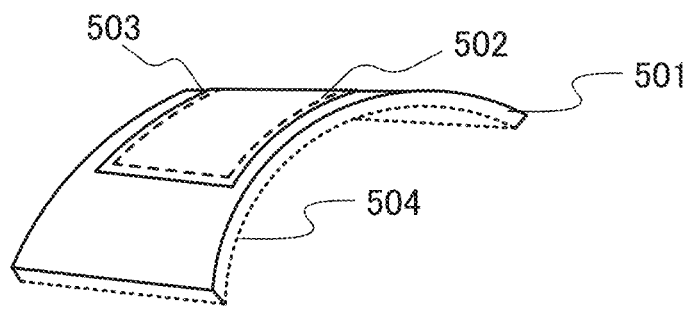
FIGS. 5A and 5B are a perspective view and a cross-sectional view illustrating one embodiment of the present invention.
Figure 5B:
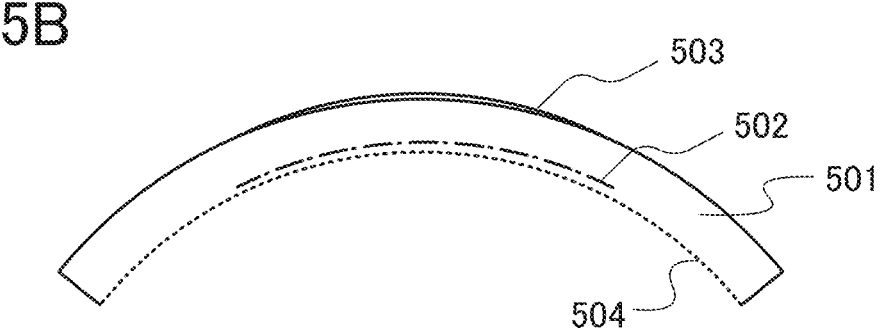

FIGS. 5A and 5B illustrate an example of a thermoplastic substance provided over the surface of the electronic device including a secondary battery. FIG. 5A is a perspective view of the electronic device and FIG. 5B is the cross sectional view.

An electronic device 500 includes a support 501 with a curved surface, a secondary battery 502 in the support 501, and a display portion 503 provided over a surface of the support 501. A thermoplastic substance 504 is formed on a whole surface of the inner curved surface, which is one of the two curved surfaces of the support 501 and has a smaller radius of curvature.

The electronic device 500 has uses as a wristwatch, a bangle, and the like. The electronic device 500 can be used as long as it properly receives body heat. For example, uses as an anklet or a necklace are also possible.

The material for the support 501 is not limited to a particular material as long as it has flexibility which can make the support 501 to be used wound around the body.

The secondary battery 502 does not necessarily include a thermoplastic substance as described in any of Embodiments 1 and 2, or may include a thermoplastic substance.

An organic EL display formed using a flexible plastic substrate can be used as the display portion 503, for example. The display portion 503 is preferably capable of being changed in form according to changing of the support 501 in form. In addition to an organic EL display, an electrophoretic display (electronic paper) is also preferably used, for example.

The thermoplastic substance 504 is not necessarily provided over the outermost surface of the electronic device 500, and may be provided inside the support as long as body heat can be conducted to the thermoplastic substance. For example, the surface of the thermoplastic substance may be covered with a high thermal conductive material.

This embodiment can be freely combined with any of the other embodiments.

(Embodiment 4)

In this embodiment, an example of fabricating a lithium-ion secondary battery with the use of a film whose surface is embossed and provided with a pattern will be described.

Figure 6A:
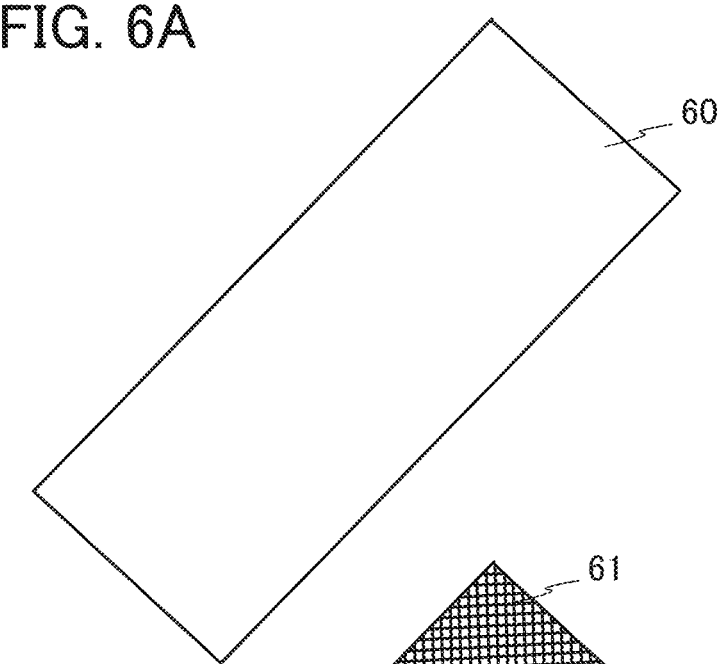
FIGS. 6A to 6C are top views illustrating one embodiment of the present invention.

First, a sheet made of a flexible base is prepared. As the sheet, a stack, a metal film provided with an adhesive layer (also referred to as a heat-seal layer) or sandwiched between adhesive layers, is used. As the adhesive layer, a heat-seal resin film containing, e.g., polypropylene or polyethylene is used. In this embodiment, a metal sheet, specifically, aluminum foil whose top surface is provided with a nylon resin and whose bottom surface is provided with a stack including an acid-proof polypropylene layer and a polypropylene layer, is used as the sheet. This sheet is cut to obtain a film 60 illustrated in FIG. 6A.

Figure 6B:
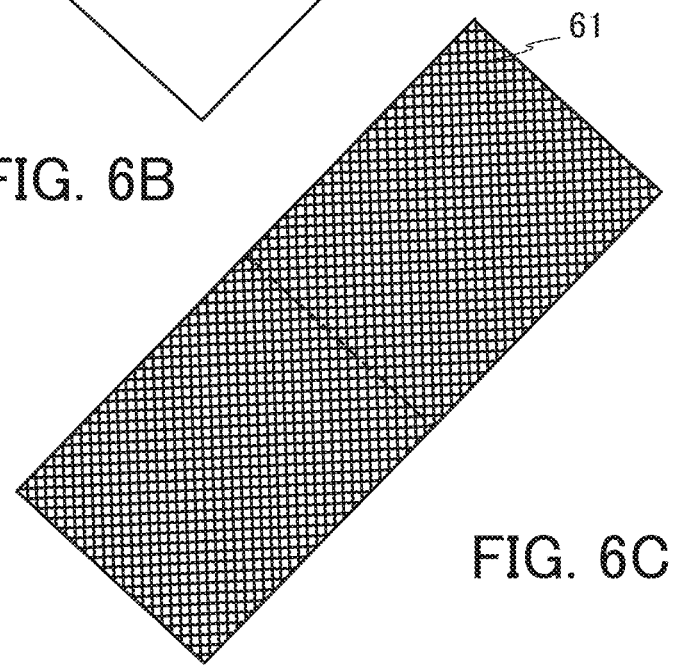

Then, the film 60 is embossed to form unevenness on the surface as illustrated in FIG. 6B so that the pattern can be visually recognized. Although an example in which the sheet is cut and then embossing is performed is described here, the order is not particularly limited; embossing may be performed before cutting the sheet, and then the sheet may be cut as illustrated in FIG. 6B. Alternatively, the sheet may be cut after thermocompression bonding is performed with the sheet bent.

Embossing, which is a kind of pressing, will be described.

Figure 7A:
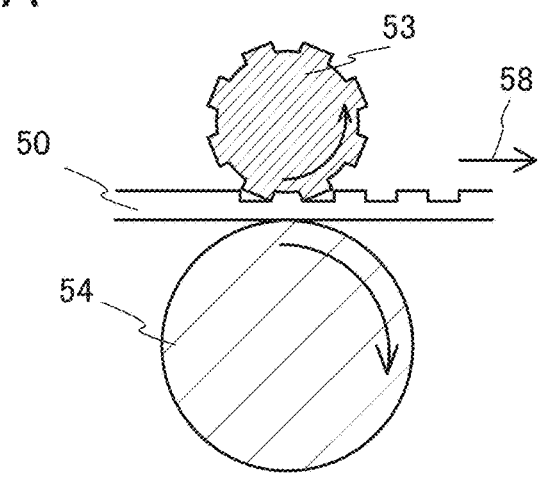
FIGS. 7A to 7C illustrate embossing of one embodiment of the present invention.
Figure 7B:
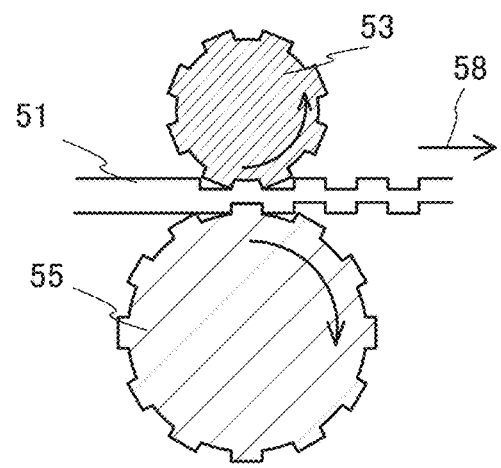
Figure 7C:
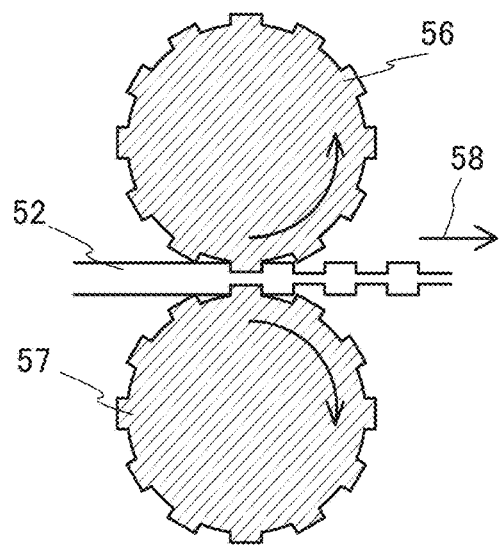

FIGS. 7A to 7C are cross-sectional views each illustrating an example of embossing. Note that embossing is a kind of pressing and refers to processing for forming unevenness corresponding to unevenness of an embossing roll on a surface of a film by bringing the embossing roll whose surface has unevenness into contact with the film with pressure. The embossing roll is a roll whose surface is patterned.

An example in which one surface of a film is embossed is illustrated in FIG. 7A.

FIG. 7A illustrates the state where a film 50 is sandwiched between an embossing roll 53 in contact with one surface of the film and a roll 54 in contact with the other surface and the film 50 is being transferred in a direction 58 of movement of the film 50. The surface of the film is patterned by pressure or heat.

FIG. 7A illustrates a combination of the embossing roll 53 and the roll 54 (a metal roll or an elastic roll (e.g., a rubber roll)).

An example in which both surfaces of a film are embossed is illustrated in FIG. 7B.

FIG. 7B illustrates the state where a film 51 is sandwiched between the embossing roll 53 in contact with one surface of the film and an embossing roll 55 in contact with the other surface and the film 51 is being transferred in the direction 58 of movement of the film 51.

FIG. 7B illustrates a combination of the embossing roll 53 which has projections and the embossing roll 55 which has depressions.

The surface of the film 51 is patterned by unevenness, that is, projections for concaving part of the surface of the film 51 and depressions for convexing part of the surface of the film 51 that are alternately provided.

FIG. 7C illustrates the state where a film 52 is sandwiched between an embossing roll 56 in contact with one surface of the film and an embossing roll 57 in contact with the other surface and the film 52 is being transferred in the direction 58 of movement of the film 52.

Processing illustrated in FIG. 7C is called Tip to Tip and performed by a combination of the embossing roll 56 and the embossing roll 57 that has the same pattern as the embossing roll 56. The phases of the projections and depressions are the same between the two embossing rolls having the same pattern, so that substantially the same pattern can be formed on the top surface and the bottom surface of the film 52.

The embossing roll is not necessarily used, and an embossing plate may be used. Furthermore, embossing is not necessarily employed, and any method that allows formation of a relief on part of the film may be employed.

In this embodiment, both surfaces of the film 60 are provided with unevenness to have patterns, and the film 61 is folded in half and sealed on three sides of four sides of the film except for one side that is a bent side with an adhesive layer.

Figure 6C:
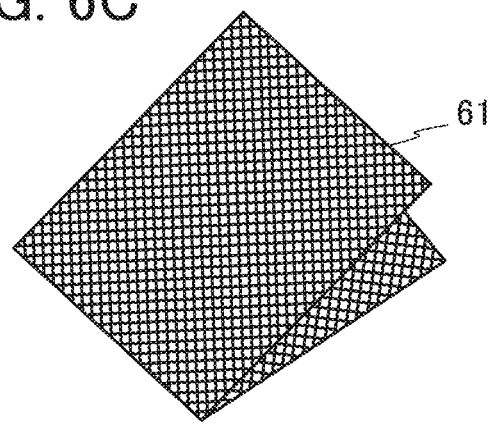

The film 61 is folded along a dotted line in FIG. 6B so as to be in the state shown in FIG. 6C.

The secondary battery of which the film 61 serving as an exterior body has a patterned surface with unevenness can suppress stress applied when the secondary battery is bent. Such a structure that can relieve a strain caused by stress can prevent the secondary battery (e.g., an exterior body) from being damaged when changed in form by being bent, for example, achieving long-time reliability.

This embodiment can be freely combined with any of the other embodiments.

(Embodiment 5)

In this embodiment, an example of fabricating a secondary battery using a current collector including a meandering portion will be described below.

First, a positive electrode active material layer is formed on one or both surfaces of one band-like metal foil.

Figure 8A:
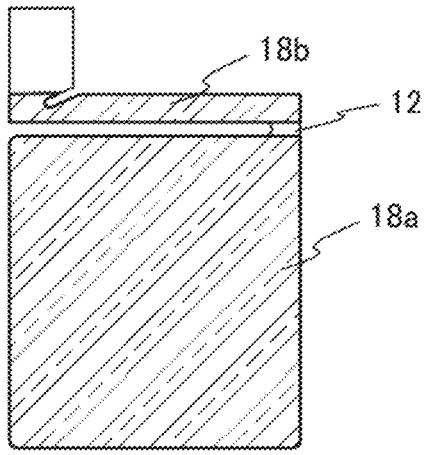
FIGS. 8A to 8D are top views and photographs of one embodiment of the present invention.

Next, laser light irradiation is performed to remove selectively the positive electrode active material layer. The positive electrode active material layer over two areas, which are a region having a small width that is connected to a lead electrode in a later step and an area having a small width in a meandering portion, is removed. Then, laser processing is performed to remove selectively both the positive electrode active material layer and the metal foil. Here, the laser irradiation is performed so that the contour of the current collector including the meandering portion is irradiated; thus, the shape of the current collector is formed. At this stage, the state illustrated in FIG. 8A can be obtained. As illustrated in FIG. 8A, part of the current collector (the root portion of the meandering portion) is exposed, so that the positive electrode active material layer 18a and the positive electrode active material layer 18b are formed.

Although the external shape of the current collector is formed by laser processing, a cutter or a punching machine may be used to process the metal foil into a desired shape, and then the processed metal foil may be formed into the current collector having a complicated shape by laser processing.

The laser processing is preferably performed after an active material layer is formed on one or both surfaces of the positive electrode current collector 12. A cutting surface formed by laser light irradiation is desirable because the current collector and the active material layer can be firmly fixed to each other by application of strong energy.

As illustrated in FIG. 8A, the number of portions having a small width in the meandering portion of the current collector is at least two; at least one of the portions (the root portion of the meandering pattern) overlaps with the boundary of adjacent active material layers (a region between the positive electrode active material layer 18a and the positive electrode active material layer 18b).

Figure 8B:
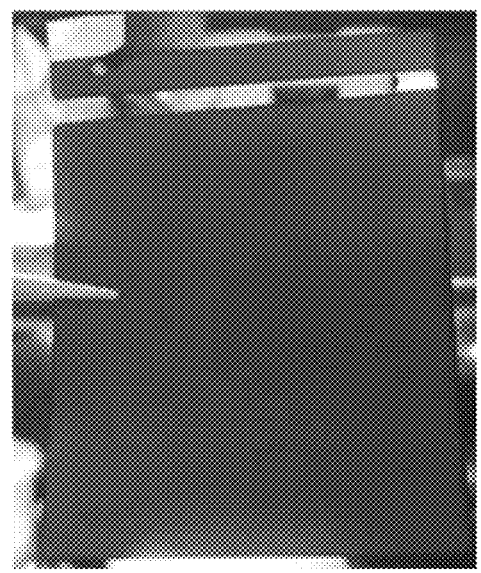

The positive electrode current collector 12 held by tweezers is shown in the photograph of FIG. 8B. As illustrated in FIG. 8A, the width of the meandering portion in the positive electrode current collector 12 is not even.

Next, a negative electrode active material layer is formed on one or both surfaces of the other band-like metal foil.

Next, laser light irradiation is performed to remove selectively the negative electrode active material layer. The negative electrode active material layer over a region having a small width that is connected to a lead electrode in a later step is removed. Then, laser processing is performed. This laser processing is performed so that the contour of the current collector including the meandering portion is irradiated; thus, the shape of the current collector is formed.

Figure 8C:
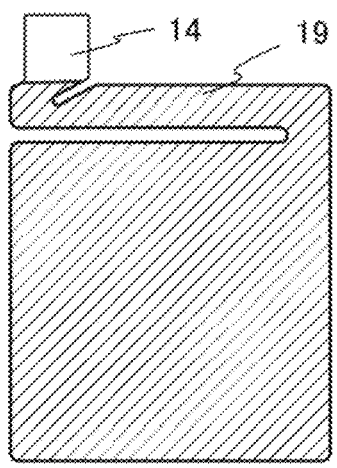
Figure 8D:
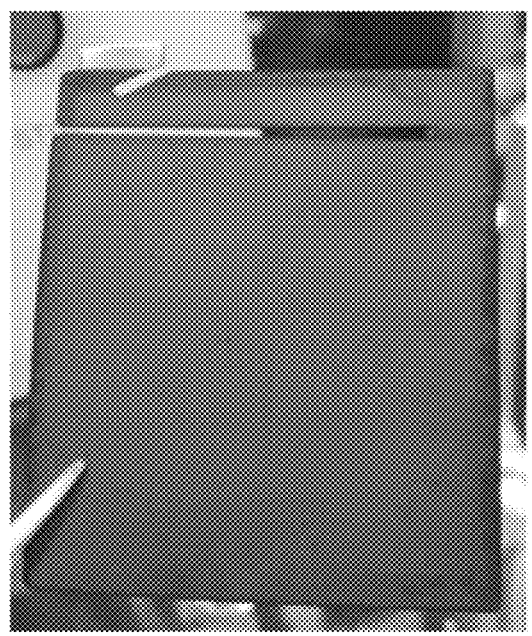

A schematic plan view of the negative electrode current collector 14 and the negative electrode active material layer 19 is shown in FIG. 8C, and a photograph of the negative electrode current collector held by tweezers is shown in FIG. 8D.

As illustrated in FIGS. 8A and 8C, both the positive electrode current collector and the negative electrode current collector include the meandering portions, which are partly different in width from each other. The meandering portion can also be referred to as a bending portion when folding is performed. The meandering portion has a bending pattern shape including a linear pattern. In this specification, the shape in which part of the contour of the current collector includes two or more repeated bends at 90° or more in the plan view is referred to as a meandering shape. Furthermore, the shape in which part of the contour of the current collector in the plan view has a rectangular wave shape, a triangular wave shape, an S-shape, or the like is also included in the meandering shape. Note that the bends in the meandering shape do not necessarily have the same pattern and a shape including irregular bends may be employed. A portion cut for forming the meandering portion is referred to as a slit.

When the positive electrode current collector and the negative electrode current collector are made to overlap with each other in a later step, the positive electrode active material layer might be positioned in a region overlapping with the slit of the negative electrode current collector. For example, in the case of the current collectors illustrated in FIGS. 8A to 8D, the slit of the negative electrode current collector overlaps with the area having a small width in the meandering portion of the positive electrode current collector. If the positive electrode active material layer exists over this area, the absence of the negative electrode active material layer in the region overlapping with the positive electrode active material layer arises. This absence might generate a problem in the battery reaction. Specifically, carrier ions released from the positive electrode active material layer might be concentrated in the negative electrode active material layer in a region closest to the slit and might be deposited on a surface of the negative electrode active material layer. Therefore, the positive electrode active material layer that does not overlap with the negative electrode active material layer, that is, the positive electrode active material layer overlapping with the area having a small width in the meandering portion of the positive electrode current collector in the case of FIGS. 8A to 8D, is removed by laser light irradiation. In this way, the deposition of carrier ions can be prevented.

For the above-described reason, the width of the slit of the positive electrode is preferably larger than or equal to that of the slit of the negative electrode. By setting the width of the slit of the positive electrode larger, the absence of the negative electrode active material layer in the region overlapping with the positive electrode active material layer can be avoided or decreased. Therefore, the deposition of carrier ions on the surface of the negative electrode active material can be prevented.

Figure 9A:
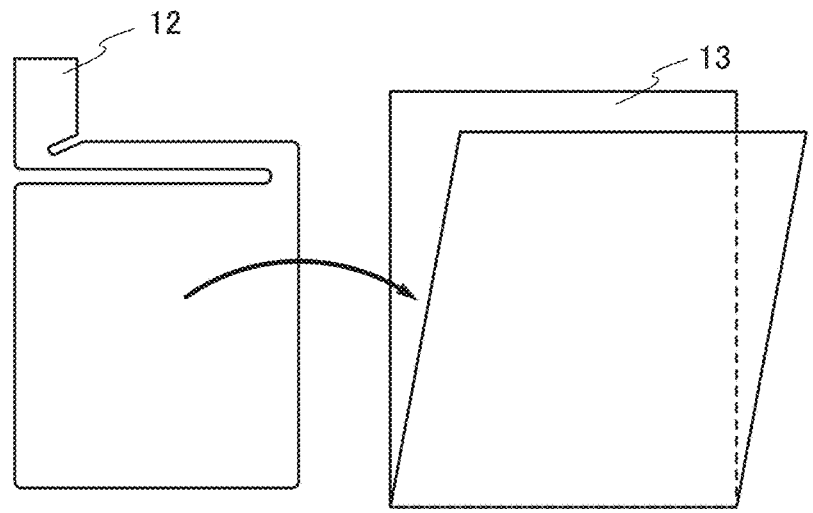
FIGS. 9A to 9C are top views and a perspective view illustrating one embodiment of the present invention.
Figure 9B:
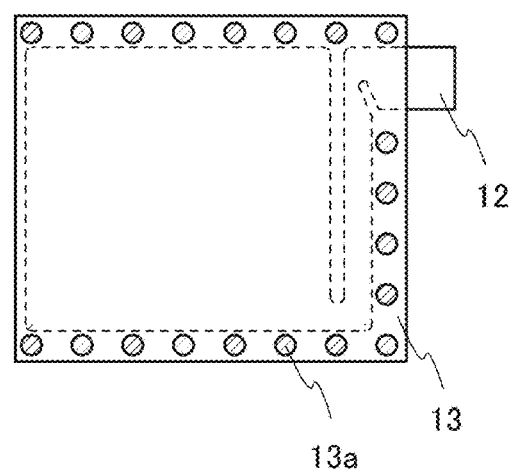

Next, as illustrated in FIG. 9A, the positive electrode current collector 12 is sandwiched by the separator 13. Then, in the separator 13, portions 13a in the region not overlapping with the positive electrode current collector 12 are bonded so that the positive electrode current collector 12 is covered by the separator 13 (FIG. 9B). Note that when polypropylene or polyvinylidene fluoride (PVDF) is used as the separator 13, bonding can be performed by thermal welding at 190° C. to 230° C. inclusive.

Figure 9C:
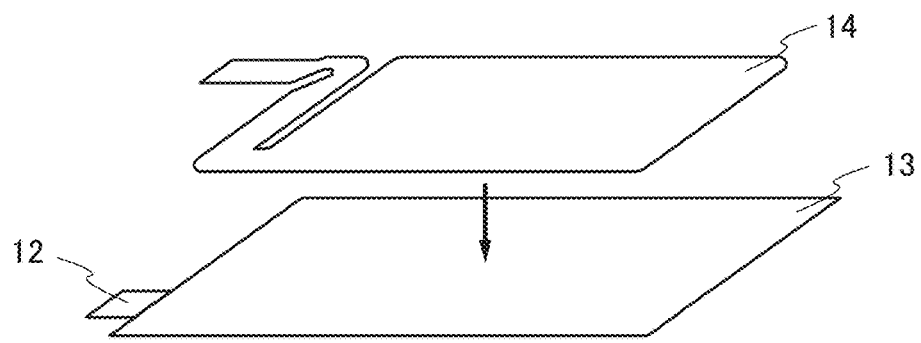

Next, as illustrated in FIG. 9C, the positive electrode current collector 12 covered by the separator 13 and the negative electrode current collector 14 are stacked. At this time, it is preferable that a plurality of positive electrode current collectors 12 and a plurality of negative electrode current collectors 14 be stacked. In this case, it is preferable that the positive electrode current collectors 12 covered with the separators 13 and the negative electrode current collectors 14 be alternately stacked. In addition, it is preferable that electrode tab portions of the positive electrode current collectors 12 overlap with each other, and electrode tab portions of the negative electrode current collectors 14 overlap with each other. By stacking and electrically connecting the plurality of positive electrode current collectors 12 and the plurality of negative electrode current collectors 14, the capacity of the secondary battery can be increased.

Then, the stacked separators 13, positive electrode current collectors 12, and negative electrode current collectors 14 are preferably fixed in a bundle. The fixing can be performed with a resin tape such as an adhesive tape or a polyimide film onto which an adhesive agent is applied or the like.

Next, the electrode tab portions of the positive electrode current collectors 12 are electrically connected to one lead electrode. The electrode tab portions of the negative electrode current collectors 14 are electrically connected to the other lead electrode. The electrical connection can be made by ultrasonic welding. In the case where the plurality of positive electrode current collectors 12 and the plurality of negative electrode current collectors 14 are stacked, the ultrasonic welding for connecting the lead electrode and the electrode tab portions of the plurality of positive electrode current collectors 12 and the ultrasonic welding for connecting the other lead electrode and the electrode tab portions of the plurality of negative electrode current collectors 14 can be performed at the same time. Thus, electrical connection between the plurality of positive electrode current collectors 12 and electrical connection between the plurality of negative electrode current collectors 14 can be made.

Note that the lead electrode connected to the positive electrode current collectors 12 may be formed of a material that can be used in the positive electrode current collectors, such as aluminum. Furthermore, the lead electrode connected to the negative electrode current collectors 14 may be formed of a material that can be used in the negative electrode current collectors, such as copper. The lead electrode electrically connected to the positive electrode current collectors 12 has the same potential as the positive electrode current collectors 12, and the same applies to the negative electrode. Materials that can be used in the current collectors can be used in the lead electrodes connected thereto.

Figure 10A:
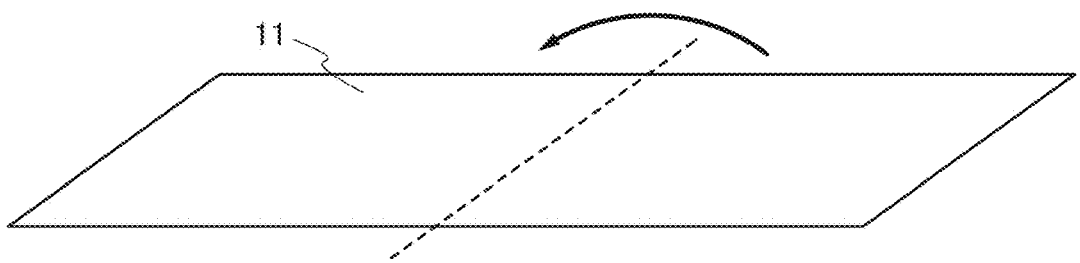
FIGS. 10A to 10E are perspective views illustrating one embodiment of the present invention.
Figure 10B:
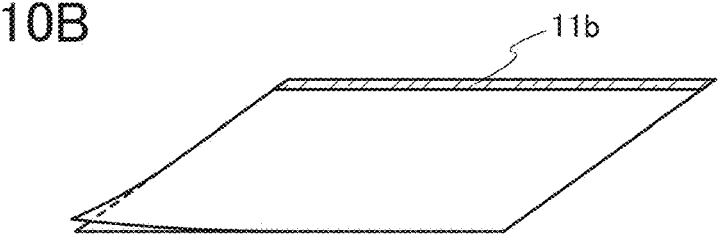

Next, as illustrated in FIGS. 10A and 10B, the perimeter of the film 11 except two sides is sealed by thermocompression bonding. In this embodiment, since one side is made by folding the film 11 as illustrated in FIG. 10B, only one side 11b is sealed in this step. Accordingly, the stacked separators 13, positive electrode current collectors 12, and negative electrode current collectors 14 can be fitted in the region surrounded by the film 11.

Note that the film 11 may be subjected to embossing in advance. By embossing, a more bendable secondary battery can be formed.

Figure 10C:
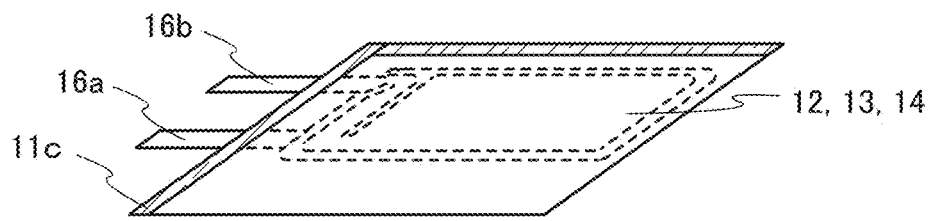

Then, as illustrated in FIG. 10C, the positive electrode current collectors 12, the separators 13, and the negative electrode current collectors 14 are fitted in the region surrounded by the film 11, and one side 11c of the film 11 is sealed by thermocompression bonding. At this time, the lead electrode 16a and the lead electrode 16b are led to the outside of the region surrounded by the film 11.

Figure 10D:
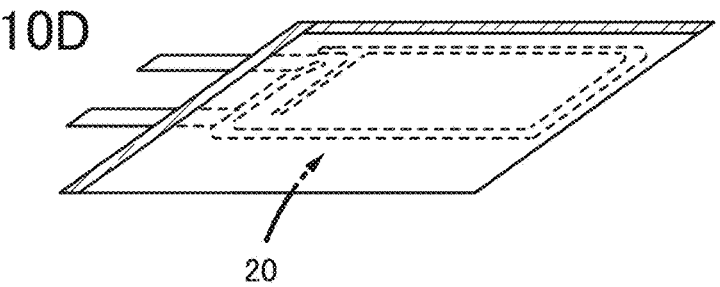
Figure 10E:
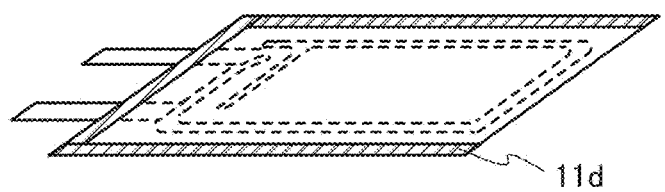

Next, as illustrated in FIG. 10D, an electrolyte solution 20 is injected into the region surrounded by the film 11. Then, as illustrated in FIG. 10E, one remaining side 11d of the film 11 is sealed under vacuum, heat, and pressure. This treatment is performed in an environment from which oxygen is eliminated, for example, in a glove box. The evacuation to a vacuum may be performed with a vacuum sealer, a liquid-pouring sealer, or the like. The film 11 can be set between two heatable bars included in the sealer, and sealing can be performed under heat and pressure. An example of the conditions is as follows: the degree of vacuum is 60 kPa, the heating temperature is 190° C., the pressure is 0.1 MPa, and the time is 3 seconds.

Then, the secondary battery obtained through the above-described steps is preferably subjected to aging treatment. By this aging treatment, formation of a film generated at the interface between the electrode and the electrolyte is controlled and the active material can be activated.

Furthermore, the secondary battery that has been subjected to the aging treatment may be opened to let out a gas generated by the aging treatment and then an electrolyte solution may be added and sealing may be performed again. If a gas exists between the positive electrode and the negative electrode, the battery reaction occurs unevenly to cause deterioration. The degassing and resealing steps can suppress deterioration.

Although three sides are sealed in order since the separators 13, the positive electrode current collectors 12, the negative electrode current collectors 14, and the film 11 used in this embodiment are rectangular, one embodiment of the present invention is not limited to this sealing method. In the case of fabricating a secondary battery having a shape other than the rectangle, the order of sealing or the sealing method can be changed as appropriate.

By partly removing the current collector having the meandering pattern and the positive electrode active material layer in the root portion of the meandering pattern, a bendable battery can be achieved.

This embodiment can be freely combined with any of the other embodiments.

(Embodiment 6)

Figure 11A:
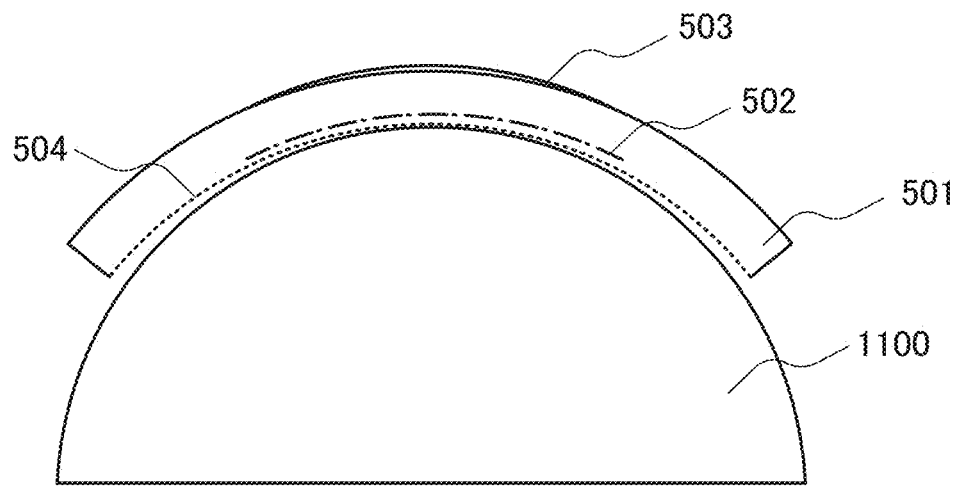
FIGS. 11A and 11B illustrate a device for charging an electronic device of one embodiment of the present invention.

FIG. 11A is a schematic view of a device for charging the electronic device 500 described in Embodiment 3. When the secondary battery is heated at around body temperature; for example, when it needs to be rapidly charged, strong external force might unintentionally bend the secondary battery beyond the limits, resulting in a too small radius of curvature. A support 1100 can solve the above problem.

The support 1100 has a top surface with an appropriate radius of curvature, of greater than or equal to 10 mm, for example.

At the time of charging, the surface of the support 1100 may be in contact with the electronic device by keeping the surface heated at around body temperature. The support 1100 may stop keeping the heat after keeping the heat at around body temperature and making the electronic device in contact therewith.

Figure 11B:
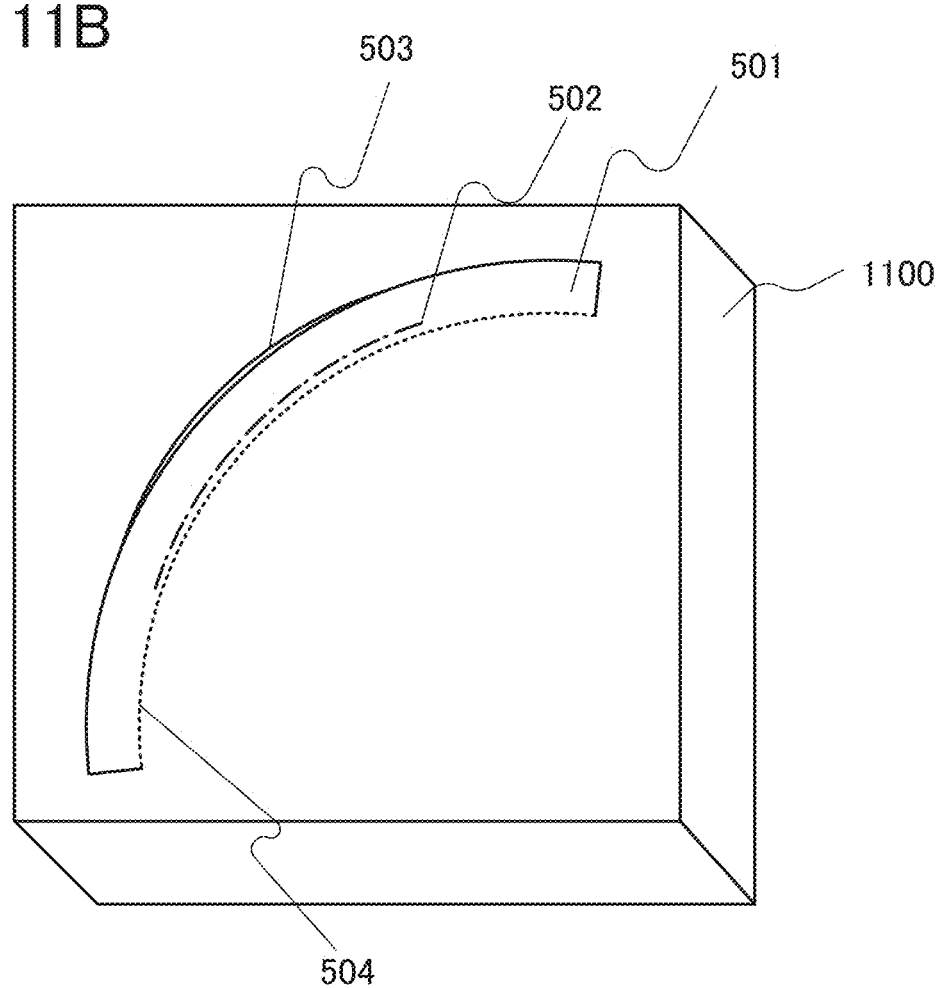

FIG. 11B is another schematic view of a device for charging the electronic device including a secondary battery. The support 1100 includes a space from the top surface to the inside in which the electronic device can be put.

A high thermal conductive material can be used for a portion where the thermoplastic substance is in contact with or close to the charger; thus, the secondary battery also can easily release heat to the outside.

When the secondary battery is not heated at around body temperature at the time of charging; for example, when it is not needed to be rapidly charged, the support as described in this embodiment is not necessarily provided.

This embodiment can be freely combined with any of the other embodiments.

(Embodiment 7)

The electronic device is provided with an antenna for wireless charging, and the wireless charging can be performed according to the Qi standard. The electronic device includes a communication device for wirelessly communicating data to be used to perform display with an external device.

The electronic device includes a power supply control circuit, which controls charge and discharge of the secondary battery.

FIGS. 12A to 12E illustrate examples of other electronic devices.

Examples of electronic devices each using a flexible power storage device are as follows: head-worn display devices such as head-mounted displays and goggle type displays, arm-worn display devices, stationary display devices (also referred to as televisions or television receivers), desktop personal computers, laptop personal computers, monitors for computers or the like, digital cameras, digital video cameras, digital photo frames, electronic notebooks, e-book readers, electronic translators, toys, audio input devices such as microphones, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, alarm devices such as smoke detectors, gas alarm devices, and security alarm devices, industrial robots, health equipment and medical equipment such as hearing aids, cardiac pacemakers, X-ray equipment, radiation counters, electric massagers, and dialyzers, mobile phones (also referred to as mobile phone devices or cell phones), portable game machines, portable information terminals, lighting devices, headphone stereos, stereos, remote controls, clocks such as table clocks and wall clocks, cordless phone handsets, transceivers, pedometers, calculators, portable or stationary music reproduction devices such as digital audio players, and large game machines such as pachinko machines.

In addition, a flexible power storage device can be incorporated along a curved inside/outside wall surface of a house or a building or a curved interior/exterior surface of a vehicle.

FIG. 12A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

FIG. 12B illustrates the mobile phone 7400 that is bent. When the whole mobile phone 7400 is bent by the external force, the power storage device 7407 included in the mobile phone 7400 is also bent. FIG. 12C illustrates the bent power storage device 7407. The power storage device 7407 is a laminated secondary battery (also referred to as a layered battery or a film-covered battery). The power storage device 7407 is fixed while being bent. Note that the power storage device 7407 includes a lead electrode 7408 electrically connected to a current collector 7409. For example, a film serving as an exterior body of the power storage device 7407 is embossed, so that the power storage device 7407 has high reliability even when bent. The mobile phone 7400 may further be provided with a slot for insertion of a SIM card, a connector portion for connecting a USB device such as a USB memory, or the like.

FIG. 12D illustrates an example of a mobile phone that can be bent. FIG. 12E illustrates the bent power storage device 7104. A mobile phone 7100 includes a housing 7101, a display portion 7102, an operation button 7103, and a power storage device 7104. Note that the power storage device 7104 includes a lead electrode 7105 that is electrically connected to a current collector 7106. For example, pressing is performed to form a plurality of projections and depressions on a surface of the film serving as the exterior body of the power storage device 7104, and maintains high reliability even when the power storage device 7104 is bent many times with different curvatures. The mobile phone 7100 may further be provided with a slot for insertion of a SIM card, a connector portion for connecting a USB device such as a USB memory, or the like.

The use of power storage devices that can be bent in vehicles enables production of next-generation clean energy vehicles such as hybrid electric vehicles (REV), electric vehicles (EV), and plug-in hybrid electric vehicles (PHEV). Moreover, power storage devices that can be bent can also be used in moving objects such as agricultural machines, motorized bicycles including motor-assisted bicycles, motorcycles, electric wheelchairs, electric carts, boats or ships, submarines, aircrafts such as fixed-wing aircrafts and rotary-wing aircrafts, rockets, artificial satellites, space probes, planetary probes, and spacecrafts.

Figure 13A:
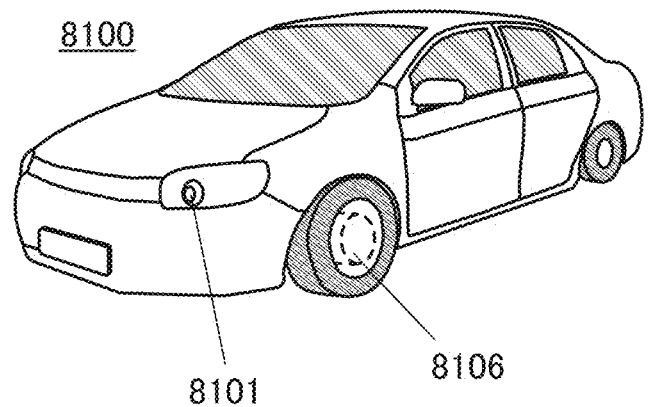
FIGS. 13A and 13B illustrate vehicles each including a secondary battery of one embodiment of the present invention.
Figure 13B:
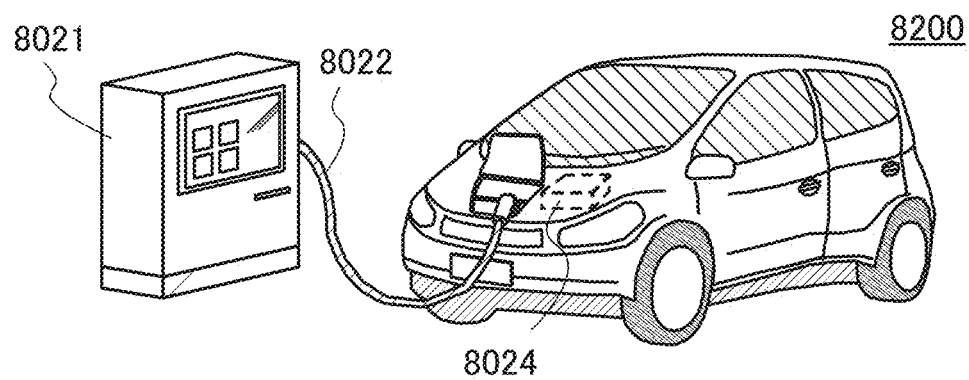
Figure 14A:
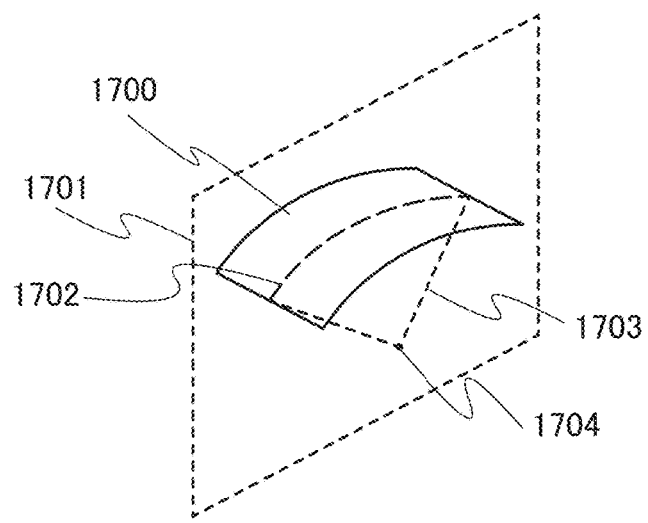
FIGS. 14A to 14C illustrate a radius of curvature of a surface.
Figure 14B:
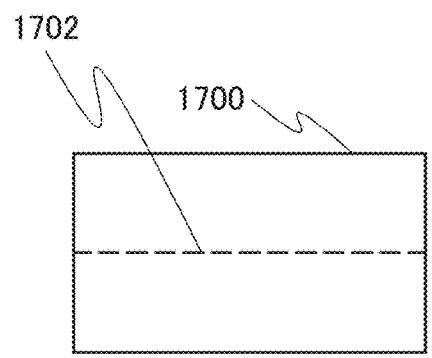
Figure 14C:
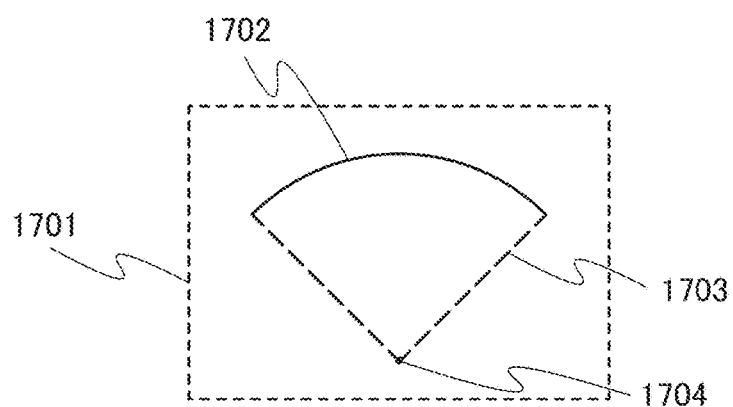
Figure 15A:
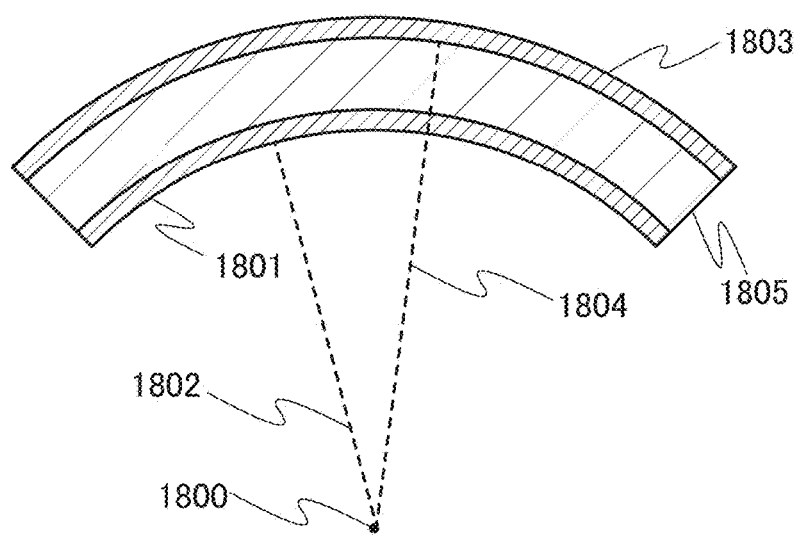
FIGS. 15A to 15C illustrate radii of curvature of surfaces.
Figure 15B:
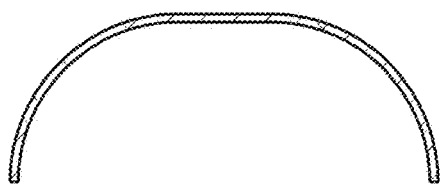
Figure 15C:
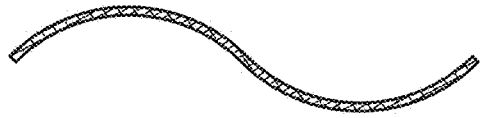

FIGS. 13A and 13B each illustrate an example of a vehicle using one embodiment of the present invention. An automobile 8100 illustrated in FIG. 13A is an electric vehicle which runs on the power of the electric motor. Alternatively, the automobile 8100 is a hybrid electric vehicle capable of driving using either the electric motor or the engine as appropriate. In the case of providing a laminated secondary battery in the vehicle, a battery module including a plurality of laminated secondary batteries is placed in one place or more than one place. According to one embodiment of the present invention, a power storage device itself can be made more compact and lightweight, and for example, when the power storage device having a curved surface is provided on the inside of a tire of a vehicle, the vehicle can increase the mileage. Furthermore, a power storage device that can have various shapes can be provided in a small space in a vehicle, which allows a space in a trunk and a space for passengers to be secured. The automobile 8100 includes the power storage device. The power storage device is used not only to drive the electric motor 8106, but also to supply electric power to a light-emitting device such as a headlight 8101 or an interior light (not illustrated).

The power storage device can also supply electric power to a display device included in the automobile 8100, such as a speedometer or a tachometer. Furthermore, the power storage device can supply electric power to a semiconductor device included in the automobile 8100, such as a navigation system.

FIG. 13B illustrates an automobile 8200 including the power storage device. The automobile 8200 can be charged when the power storage device is supplied with electric power through external charging equipment by a plug-in system, a contactless power feeding system, or the like. In FIG. 13B, the power storage device included in the automobile 8200 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the power storage device 8024 included in the automobile 8200 can be charged by being supplied with electric power from outside. The charging can be performed by converting AC electric power into DC electric power through a converter such as an AC-DC converter.

Furthermore, although not illustrated, the vehicle may include a power receiving device so as to be charged by being supplied with electric power from an above-ground power transmitting device in a contactless manner. In the case of the contactless power feeding system, by fitting the power transmitting device in a road or an exterior wall, charging can be performed not only when the electric vehicle is stopped but also when driven. In addition, the contactless power feeding system may be utilized to perform transmission and reception of electric power between two vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the degree of flexibility in place where the power storage device can be provided is increased and thus a vehicle can be designed efficiently. The compact and lightweight power storage device contributes to a reduction in the weight of a vehicle, and thus increases the mileage. Furthermore, the power storage device included in the vehicle can also be used as a power source for supplying electric power to products other than the vehicle. In such a case, the use of a commercial power source can be avoided at peak time of electric power demand.

This embodiment can be freely combined with any of the other embodiments.

Note that a content (or part thereof) described in one embodiment may be applied to, combined with, or replaced by a different content (or part thereof) described in the embodiment and/or a content (or part thereof) described in one or a plurality of different embodiments.

Note that in each embodiment, a content described in the embodiment is a content described with reference to a variety of diagrams or a content described with a text described in this specification.

Note that by combining a diagram (or part thereof) illustrated in one embodiment with another part of the diagram, a different diagram (or part thereof) illustrated in the embodiment, and/or a diagram (or part thereof) illustrated in one or a plurality of different embodiments, much more diagrams can be formed.

This application is based on Japanese Patent Application serial No. 2015-006334 filed with Japan Patent Office on Jan. 16, 2015, the entire contents of which are hereby incorporated by reference.

What is claimed is:

1. A wearable electronic device comprising:
a secondary battery including at least a positive electrode, a negative electrode, a separator, and an exterior body;
a flexible housing including the secondary battery therein;
a display portion provided on a top surface of the flexible housing; and
a first substance provided on a rear surface of the flexible housing, wherein the secondary battery is provided between the display portion and the first substance, wherein the rear surface of the flexible housing is an inner curved surface of the flexible housing when the wearable electronic device is worn, wherein the first substance is provided on a whole surface of the inner curved surface of the flexible housing, wherein the first substance becomes flexible by absorbing heat from a surface of a user's body when the wearable electronic device is worn, and wherein the first substance becomes rigid after the wearable electronic device is taken off the user's body.

2. The wearable electronic device according to claim 1, wherein the first substance comprises polyvinyl acetate.

3. The wearable electronic device according to claim 1, wherein the first substance comprises a homopolymer.

4. The wearable electronic device according to claim 1, wherein the first substance comprises a copolymer.

5. The wearable electronic device according to claim 1, wherein the first substance becomes more flexible at around a temperature of the surface of the user's body than at room temperature.

6. The wearable electronic device according to claim 1, wherein the wearable electronic device is one of a watch and a bangle.

7. The wearable electronic device according to claim 1, wherein the first substance at a temperature of higher than or equal to 30° C. and lower than or equal to 37° C. is more flexible than the first substance at room temperature.

8. The wearable electronic device according to claim 1, wherein the secondary battery is flexible.

9. The wearable electronic device according to claim 1, wherein the secondary battery further includes a second substance inside the exterior body, and wherein the second substance is a thermoplastic substance.

10. The wearable electronic device according to claim 9, wherein the second substance has a bar-like shape, and wherein the second substance is positioned along a side of the exterior body.

11. The wearable electronic device according to claim 9, wherein the second substance is U-shaped, and wherein sides of the separator are surrounded by the second substance.

12. A wearable electronic device comprising:

a flexible secondary battery including at least a positive electrode, a negative electrode, a separator, and an exterior body;

a flexible housing including the flexible secondary battery therein, wherein the flexible housing has an outer curved surface and an inner curved surface when the wearable electronic device is worn;

a display portion provided on the outer curved surface of the flexible housing; and a first substance provided on a whole surface of the inner curved surface of the flexible housing, wherein the flexible secondary battery is provided between the display portion and the first substance, wherein the first substance becomes flexible by absorbing heat from a surface of a user's body when the wearable electronic device is worn, and wherein the first substance becomes rigid after the wearable electronic device is taken off the user's body.

13. The wearable electronic device according to claim 12, wherein the first substance comprises polyvinyl acetate.

14. The wearable electronic device according to claim 12, wherein the first substance comprises a homopolymer.

15. The wearable electronic device according to claim 12, wherein the first substance comprises a copolymer.

16. The wearable electronic device according to claim 12, wherein the first substance becomes more flexible at around a temperature of the surface of the user's body at room temperature.

17. The wearable electronic device according to claim 12, wherein the wearable electronic device is one of a watch and a bangle.

18. The wearable electronic device according to claim 12, wherein the first substance at a temperature of higher than or equal to 30° C. and lower than or equal to 37° C. is more flexible than the first substance at room temperature.

19. The wearable electronic device according to claim 12, wherein the flexible secondary battery further includes a second substance inside the exterior body, and wherein the second substance is a thermoplastic substance.

20. The wearable electronic device according to claim 19, wherein the second substance has a bar-like shape, and wherein the second substance is positioned along a side of the exterior body.

21. The wearable electronic device according to claim 19, wherein the second substance is U-shaped, and wherein sides of the separator are surrounded by the second substance.

* * * * *